(12) United States Patent
Kearney et al.

(10) Patent No.: US 11,456,776 B2
(45) Date of Patent: Sep. 27, 2022

(54) INTELLIGENT MODULES FOR INTELLIGENT NETWORKS

(71) Applicant: KORRUS, INC., Los Angeles, CA (US)

(72) Inventors: Phil Kearney, Fremont, CA (US);
Laszlo Takacs, Fremont, CA (US);
Michael Larson, Fremont, CA (US);
Artem Mishin, Fremont, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

(21) Appl. No.: 16/377,452

(22) Filed: Apr. 8, 2019

(65) Prior Publication Data

US 2019/0305821 A1    Oct. 3, 2019

Related U.S. Application Data

(63) Continuation of application No. 15/851,125, filed on Dec. 21, 2017, now Pat. No. 10,270,489, which is a
(Continued)

(51) Int. Cl.
*H04B 3/54* (2006.01)
*H04L 25/49* (2006.01)
(Continued)

(52) U.S. Cl.
CPC .............. *H04B 3/54* (2013.01); *G05B 15/02* (2013.01); *H04L 12/66* (2013.01); *H04L 25/02* (2013.01);
(Continued)

(58) Field of Classification Search
CPC ........ G05B 15/02; G05B 19/048; H04B 3/54; H04B 3/542; H04B 3/56; H04L 12/26;
(Continued)

(56) References Cited

U.S. PATENT DOCUMENTS 5,471,119 A    11/1995 Ranganath
6,577,080 B2    6/2003 Lys
(Continued)

FOREIGN PATENT DOCUMENTS

WO    2014059122 A2    4/2014

OTHER PUBLICATIONS

International Preliminary Report on Patentability dated Dec. 25, 2018 for International Application No. PCT/US2017/038833, 7 pages.
(Continued)

*Primary Examiner* — Shawkat M Ali
(74) *Attorney, Agent, or Firm* — FisherBroyles LLP

(57) ABSTRACT

A system comprising: a host device comprising at least, an electrical interface configured for connection to a powerline; a first releasable interface; a powerline communication module for transmitting and receiving information over the powerline; an intelligent module comprising at least, a second releasable interface interconnected to the first releasable interface; a digital processor; memory operatively connected to the processor and configured with instructions for causing the processor to receive and transmit information over the powerline through the powerline communication module.

2 Claims, 9 Drawing Sheets

Related U.S. Application Data continuation-in-part of application No. PCT/US2017/038833, filed on Jun. 22, 2017.

(60) Provisional application No. 62/440,694, filed on Dec. 30, 2016, provisional application No. 62/353,275, filed on Jun. 22, 2016.

(51) Int. Cl.
| | |
|---|---|
| *H05B 47/185* | (2020.01) |
| *H04L 25/02* | (2006.01) |
| *G05B 15/02* | (2006.01) |
| *H04L 12/66* | (2006.01) |

(52) U.S. Cl.
CPC ....... *H04L 25/4902* (2013.01); *H05B 47/185* (2020.01); *H04B 2203/5458* (2013.01); *Y02B 20/40* (2013.01)

(58) Field of Classification Search
CPC ..... H04L 12/28; H04L 12/2807; H04L 25/02; H04L 25/026; H04L 25/0272; H04L 29/08; H04W 48/10
USPC ....... 375/219, 257, 295, 316; 710/8; 714/4.3
See application file for complete search history.

(56) References Cited

U.S. PATENT DOCUMENTS

| | | |
|---|---|---|
| 7,318,659 B2 | 1/2008 | Demarest |
| 8,179,058 B1 | 5/2012 | Campbell |
| 8,410,630 B2 | 4/2013 | Campbell |
| 8,614,552 B2 | 12/2013 | Campbell |
| 8,742,673 B2 | 6/2014 | Campbell |
| 8,759,999 B2 | 6/2014 | Campbell |
| 8,768,493 B2 | 7/2014 | Souvay |
| 9,024,464 B2 | 5/2015 | Campbell |
| 9,326,358 B2 | 4/2016 | Campbell |
| 9,622,329 B2 | 4/2017 | Campbell |
| 9,635,733 B2 | 4/2017 | Shea |
| 9,699,862 B2 | 7/2017 | Campbell |
| 9,713,227 B2 | 7/2017 | Campbell |
| 10,019,047 B2 | 7/2018 | Bull |
| 2002/0014535 A1 | 2/2002 | Okada |
| 2008/0122642 A1 | 5/2008 | Radtke |
| 2008/0272714 A1 | 11/2008 | Noble |
| 2010/0118148 A1 | 5/2010 | Lee |
| 2010/0238003 A1 | 9/2010 | Chan |
| 2012/0215325 A1 | 8/2012 | Wu |
| 2013/0094204 A1* | 4/2013 | Budai ............... F21V 33/00 362/230 |
| 2013/0261821 A1 | 10/2013 | Lu |
| 2013/0293155 A1 | 11/2013 | Campbell |
| 2013/0320862 A1 | 12/2013 | Campbell |
| 2014/0356229 A1* | 12/2014 | Farren ............... A23L 3/28 422/24 |
| 2015/0180538 A1 | 6/2015 | Smith |
| 2015/0256665 A1 | 9/2015 | Pera |
| 2015/0271898 A1 | 9/2015 | Campbell |
| 2016/0028605 A1* | 1/2016 | Gil ............... H04W 4/38 709/213 |
| 2016/0044765 A1 | 2/2016 | Campbell |
| 2016/0081155 A1 | 3/2016 | Campbell |
| 2016/0164695 A1 | 6/2016 | Fabre |
| 2016/0165702 A1 | 6/2016 | Lai |
| 2016/0302280 A1 | 10/2016 | Harbers |
| 2016/0339203 A1 | 11/2016 | Krames |
| 2016/0341436 A1 | 11/2016 | Parker |
| 2017/0171947 A1 | 6/2017 | Campbell |
| 2017/0207926 A1 | 7/2017 | Gil |
| 2017/0295476 A1* | 10/2017 | Webb ............... H04W 4/12 |
| 2017/0361124 A1 | 12/2017 | Parker |

OTHER PUBLICATIONS

International Search Report dated Oct. 19, 2017 for International Application No. PCT/US17/38833, 4 pages.
NXP, UM10800 LPC82x User Manual, Sep. 2014.
Unpublished U.S. Appl. No. 14/543,164, filed Nov. 17, 2014.
Chinese Office Action dated Jan. 22, 2021, in Chinese Application No. 201780051381.8, including English machine translation.
Notice of Allowance dated Aug. 30, 2021, in Chinese Application No. 201780051381.8, including English translation.

* cited by examiner

INTELLIGENT MODULES FOR INTELLIGENT NETWORKS

REFERENCE TO RELATED APPLICATIONS

This application is a continuation of U.S. application Ser. No. 15/851,125, filed Dec. 21, 2017, which is a continuation-in-part of application PCT/US2017/38833 filed on Jun. 22, 2017, which claims priority to U.S. Provisional Application No. 62/353,275, filed Jun. 22, 2016, and on U.S. Provisional Application No. 62/440,694, filed Dec. 30, 2016, all of which are hereby incorporated by reference in their entirety.

REFERENCE TO APPENDIX

Appendix A is being filed as part of this application and provides a description of the Simple Device Management Protocol (SDMP).

FIELD OF INVENTION

The invention relates generally to intelligent systems for homes and buildings, and, more specifically, to a modular device that transforms existing infrastructure into a network backbone for an intelligent system.

BACKGROUND

Energy efficiency, security, and safety are just a few of the concerns that driving the need for intelligent systems to control environmental conditions such as, for example, light and heat, in homes and buildings. As used herein, an intelligent system is a system in a home or building that monitors an environmental condition (e.g., light intensity, light quality, temperature, ventilation, humidity, filtration/air quality, sound, etc.) in the home or building, and potentially controls the same or another environmental condition based on one or more predetermined parameters or events (e.g., time of day, occupancy, temperature, etc.) and logic (e.g., if x, then y, or other common logic operator). Typically, although not necessarily, such intelligent systems may also involve an environmental device (e.g., lamp, HVAC unit, dehumidifier, etc.) for effecting an environmental change (e.g., increasing/decreasing light, increasing/decreasing temperature, etc.) to meet a desired environmental condition (e.g., more/less light, more/less heat, etc.)

For example, a programmable thermostat is an example of a simple intelligent system. It sets the temperature of a room based on the time of day, which causes the HVAC unit to react and either cool or heat the room to the desired temperature. Examples of more sophisticated intelligent systems include intelligent lighting systems, which turn lights on and off in a particular space depending on whether the space is occupied, and security systems, which monitor movement in and about a home or building, and activate an alarm (e.g., flashing light or sound or notification to a mobile device) when the movement is determined to be that of a person who should not be there at that particular time of day. Still other intelligence systems are being developed as the ability to sense movement and measure a wide range of environmental conditions becomes more reliable and less expensive.

Often these intelligent systems depend on wireless technology between the different system components (e.g., sensors, processors and environment devices to control the environment). Wireless technology is preferred because metallic connection among the systems components is required, and, thus, the system components can be installed in a preexisting home or building without the need to route wiring through the walls/ceilings.

Although wireless communication is convenient, it is not particularly reliable. For example, the wireless bandwidth designated for such use is narrow and is becoming more crowded. The competition among different devices in this space often causes signals to be dropped, corrupted, or otherwise disrupted. For example, older cordless phones, which operate in this bandwidth, can disrupt the communication of other wireless devices when transmitting. Additionally, wireless communication tends to be limited by distance and signal-blocking walls and other structures within homes and building. Therefore, there is a need for intelligent systems having components that are easily installed, yet are not faced with the limitations of wireless communications mentioned above. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention transforms existing infrastructure of a home or building to a network backbone for an intelligent system. More specifically, in one embodiment, the present invention exploits the electrical powerline of a home/building as a backbone for an intelligent system network, and introduces an intelligent module (IM) or "Smart Snap"™ module to transform existing outlets (e.g., electrical/light sockets) on the electrical powerline to nodes on the network for the communication of information among devices connected to the electrical powerline.

Using the powerline as a network backbone provides for an extensive array of sensors. Applicants recognize most modern homes and buildings have an infrastructure of wiring to provide electrical power to various outlets and lamp sockets throughout the home or building. Applicants also recognize that the number of outlets and lamp sockets greatly outnumbers the typical number of sensors required in most home intelligent systems. For example, while a typical America home has one or two thermostats to control HVAC, the home has, on average, over 51 light sockets. Likewise, there is an average of 25 lamps per 1000 square feet in an office building. Therefore, by transforming these outlets to network nodes through the use of an IM that conveniently interengages with a lamp or other device connected to the outlet, the existing electrical powerline of the house is transformed into a communication backbone for an intelligent network for the home or building.

Communication over the power line is effected by using a known powerline communication (PLC) protocol. Other wireless technologies such as Bluetooth, Bluetooth Low Energy (BLE), and Wi-Fi can also be used to wirelessly interface with the powerline network.

One feature of the IM is that it can be configured for a specific application by incorporating the necessary hardware/sensors and/or software for executing the specific application (e.g., sensing light, motion, sound, heat, humidity, images, etc.). In one embodiment, the IM modules are identical in form factor, regardless of their function, and, thus, each can be plugged into a host device in the releasable interface, thereby changing the functionality of the host device without changing the host device.

Accordingly, one aspect of the invention is an intelligent system that combines an IM with one or more host devices. In one embodiment, the intelligent system comprises: (a) a host device comprising at least: an electrical interface configured for connection to a powerline; a first releasable interface interconnected with a second releasable interface of an intelligent module; (b) a powerline communication module for transmitting and receiving information over the powerline; and (c) the intelligent module comprising at least: the second releasable interface interconnected to the first releasable interface; a digital processor; memory operatively connected to the processor and configured with instructions for causing the processor to receive and transmit information over the powerline through the powerline communication module. Such a system may be used in a variety of applications. In one particular embodiment, the system is configured for lighting and is equipped with various sensors to provide smart lighting to achieve various objectives, including, for example, higher efficiency, Circadian cycle accommodation, therapeutic eye treatment, and bacteria suppression, just to name a few.

Another aspect of the invention is an IM configured to interface with a device connected to an electrical powerline and communicate over the powerline. In one embodiment, the IM is configured for attachment to a host device connected to a powerline, and comprises: a releasable interface configured for electrical interconnection with a cooperating releasable interface on the host device; a digital processor; and memory operatively connected to the processor and configured with instructions for causing the processor to receive and transmit information over a powerline through a powerline communication module Yet another aspect of the invention is a host device that is configured to receive an IM. In one embodiment, the host device is configured for attachment to a network having an intelligent module, and comprises: an electrical interface configured for connection to a powerline; a powerline communication module for transmitting and receiving information over the powerline; a working element; control circuitry for controlling the working element; a digital processor; and memory operatively connected to the processor and configured with instructions for causing the processor to operate in at least a first mode in which it receives information over the powerline through the powerline communication module and controls the control circuitry based on the information.

Still another aspect of the invention is a device configured for connection to a network having an intelligent module. In one embodiment, the device comprises: (a) an electrical interface configured for connection to a powerline; (b) a powerline communication module for transmitting and receiving information over said powerline; (c) a working element; (d) control circuitry for controlling said working element; (e) a digital processor; and (f) memory operatively connected to said processor and configured with instructions for causing said processor to operate in at least a first mode in which it receives information over said powerline through said powerline communication module and controls said control circuitry based on said information. In one particular embodiment, the processor is configured to process instructions based on Simple Device Management Protocol (SDMP).

Still another aspect of the invention is an intelligent system network comprising at least one IM installed in one of a plurality of host devices. In one embodiment, the network comprises: (a) an electrical powerline having two or more outlets; (b) first and second devices connected to said two or more outlets and electrically connected to said powerline, said first and second devices configured to communicate over said powerline; and (c) an IM physically and electrically connected to said first device such that said IM is electrically connected to said powerline through said first device, and is configured to cause said first and second devices to transmit information therebetween over said powerline.

Another aspect of the invention is a method of communicating between a wireless device and two or more nodes communicatively connected over an electrical powerline. In one embodiment, the method comprises: (a) communicating at least one first signal between at least one first node on said electrical powerline and said wireless device over a wireless link; and (b) communicating at least one second signal between said at least one first node and at least one second node over said electrical powerline, wherein at least one of said at least one first or second nodes is operatively connected to a device, said device being configured in at least a first configuration and a second configuration, in said first configuration, said second signal is responsive to said first signal and said second signal controls said device, and, in said second configuration, said first signal is responsive to said second signal and said second signal contains data from said device.

Still another aspect of the invention is a locating system and method for locating an object in an area. In one embodiment, the object comprises a unique identifier, and the method comprises: (a) correlating said object with a searchable unique identifier; (b) scanning said area for said searchable unique identifier using at least one IM installed in an outlet of powerline; and (c) signaling a user based on whether said searchable unique identifier is found in said area.

DETAILED DESCRIPTION

Figure 1B:
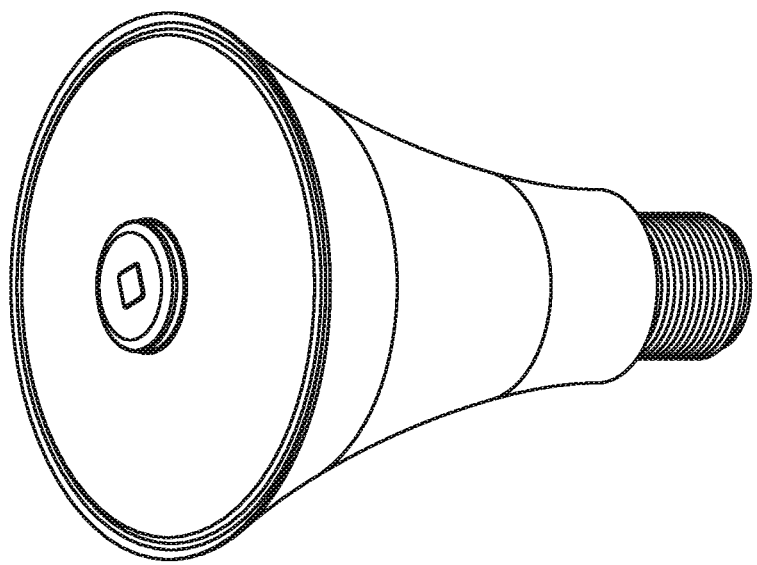
FIG. 1B is a perspective view of the lamp host device of FIG. 1a with the IM installed.
Figure 1A:
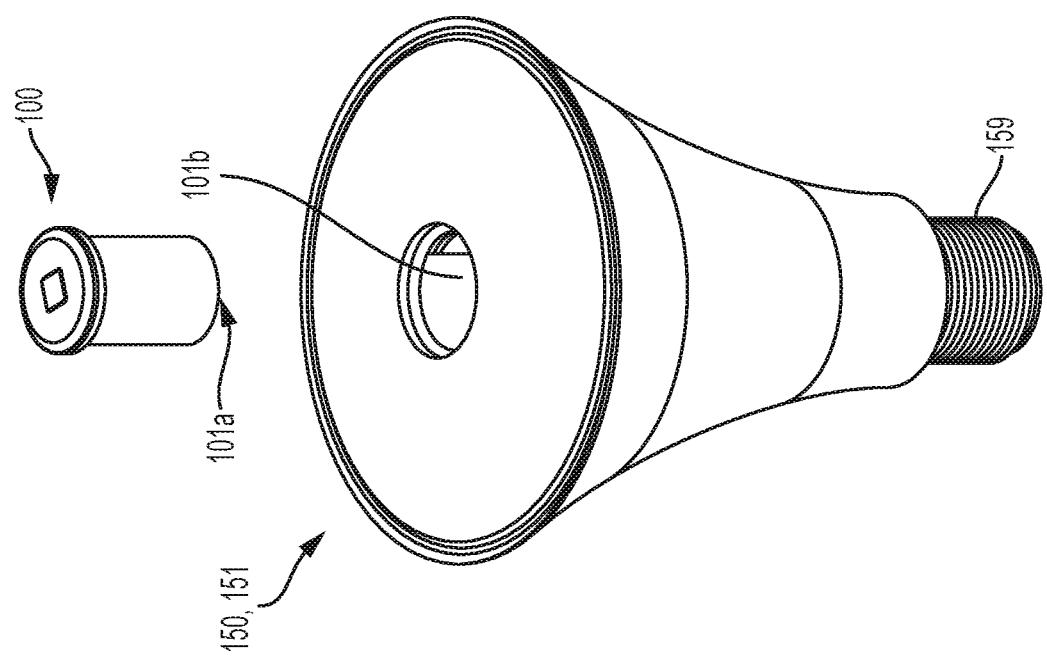
FIG. 1A is perspective view of a one embodiment of lamp host device of the present invention about to receive an IM of the present invention.

FIG. 1A shows one embodiment of the invention in which an IM (IM) 100 is in position to be plugged into a host device 150, which, in this embodiment, is a lamp 151, and FIG. 1B shows the IM 100 plugged into the host device 150. The host device 150 comprises an electrical interface 159 for connecting to a powerline (not shown) through a standard lamp receptacle. The IM 100 is configured for attachment to the host device 150 using cooperating pluggable connectors 101a and 101b, thereby connecting the IM 100 to the powerline through the host device 150. In this way, the host device and IM cooperate to transform existing outlets (e.g., electrical/light sockets) on an electrical powerline to nodes of a network for the communication of data/control signals among devices connected to the electrical powerline.

As used herein, an "outlet" on a powerline broadly refers to any electrical receptacle, lamp receptacle, junction box, drop, or other point along the powerline providing access to the powerline. In one particular embodiment, an outlet is an electrical receptacle or lamp receptacle. In a very particular embodiment, the outlet is a lamp receptacle. As used herein "electrical interface," is any known interface for connecting to an outlet as described above. For example, if the outlet is a wall socket, the electrical interface may be conventional prongs; if the outlet is a lamp receptacle, the electrical interface may be a threaded base, a plug or prongs depending on the receptacle type; or if the outlet is a junction box, the electrical interface may be wires which are connected to the conductors in the junction box using known connectors (e.g., wire nuts). Still other electrical outlets and interfaces will be obvious to those of skill in the art in light of this disclosure.

As mentioned above, one feature of the IM is that the different functionality for performing the different applications above can be packaged in IMs having the same form factor and releasable interface, thereby allowing different IMs to be interchangeable with the same host device, and, thus, changing the functionality of the host device without changing the host device. Furthermore, in the embodiment shown in FIG. 1, the host device 150 is lamp 151 having the form factor of a standard lamp and has a standard electrical interface 159 for connecting to a standard lamp receptacle or existing luminaires. In this way, the host lamp and IM of the present invention can convert an existing powerline having standard lamp receptacles into a powerful network, an embodiment of which is shown in FIG. 3.

Figure 2:
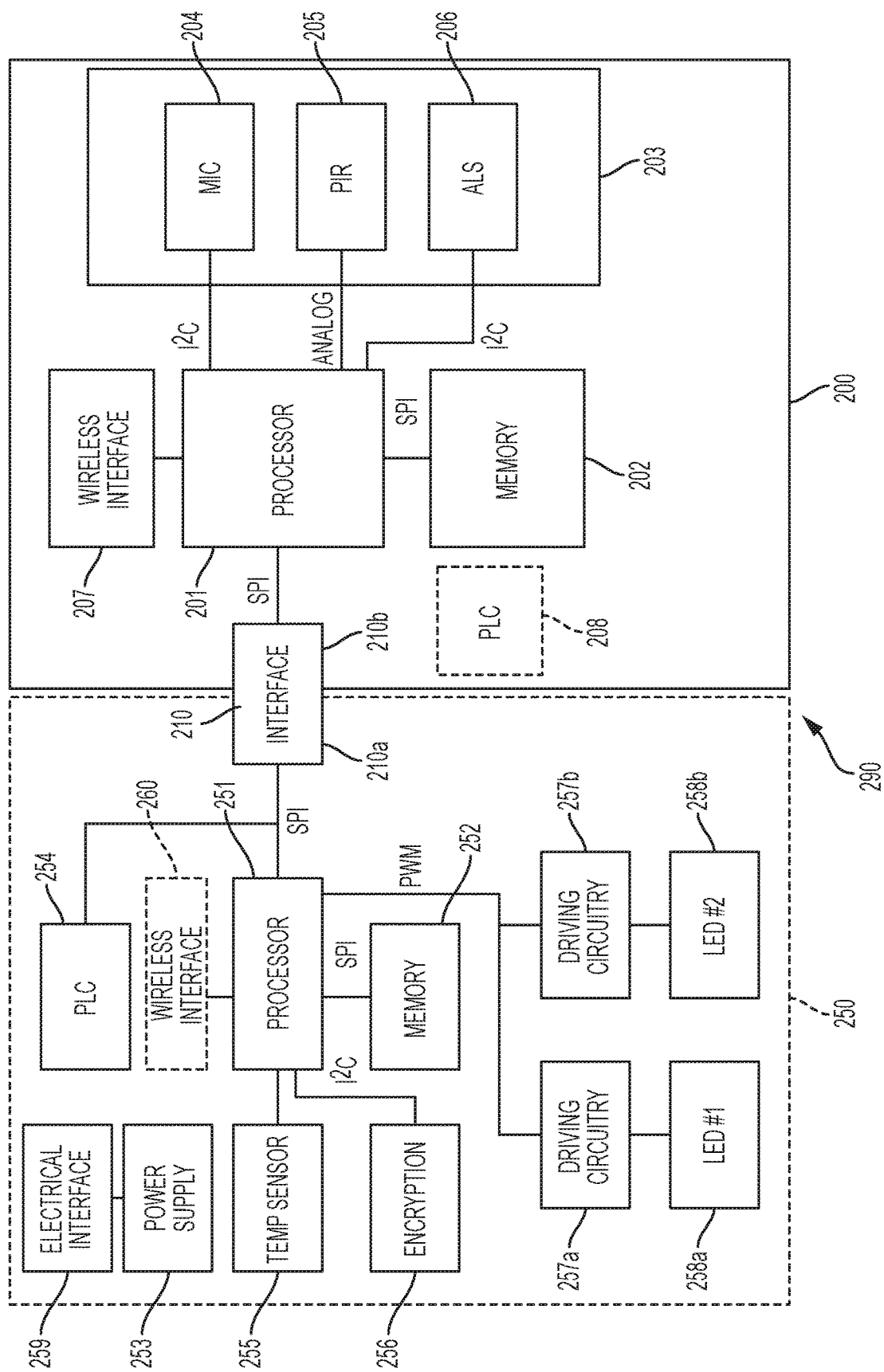
FIG. 2 is a block diagram of one embodiment of an intelligent system of a host device connected to an IM.

Referring to FIG. 2, a schematic is shown of one embodiment of the system 290 the present invention comprising an IM 200 connected to a host device 250. The host device 250 comprises an electrical interface 259 configured for connection to a powerline (not shown). The powerline provides power to the power supply 253. In this particular embodiment, the host device also comprises a powerline communication (PLC) module 254 for transmitting and receiving information over the powerline. (It should be understood that while this embodiment is configured with the powerline communication module in the host device, alternative configurations are possible, including, for example, a PLC module 208 being disposed in the IM 200, or a PLC module being a standalone component of the system.). The system 290 also comprises a releasable electrical interface 210 between the IM 200 and the host device 250. In one embodiment, the host device comprises a first releasable interface 210a that cooperates with a second releasable interface 210b of the IM 200, thereby facilitating the IM's access to the PLC module 254 and the powerline in the embodiment of FIG. 2. The IM 200 comprises a digital processor 201 and memory 202 operatively connected to the processor and configured with instructions for causing the processor to receive and transmit information over the powerline through the PLC module. In one embodiment, the IM 200 receives power from a powerline via electrical interface 259 via the interface 210.

Figure 3:
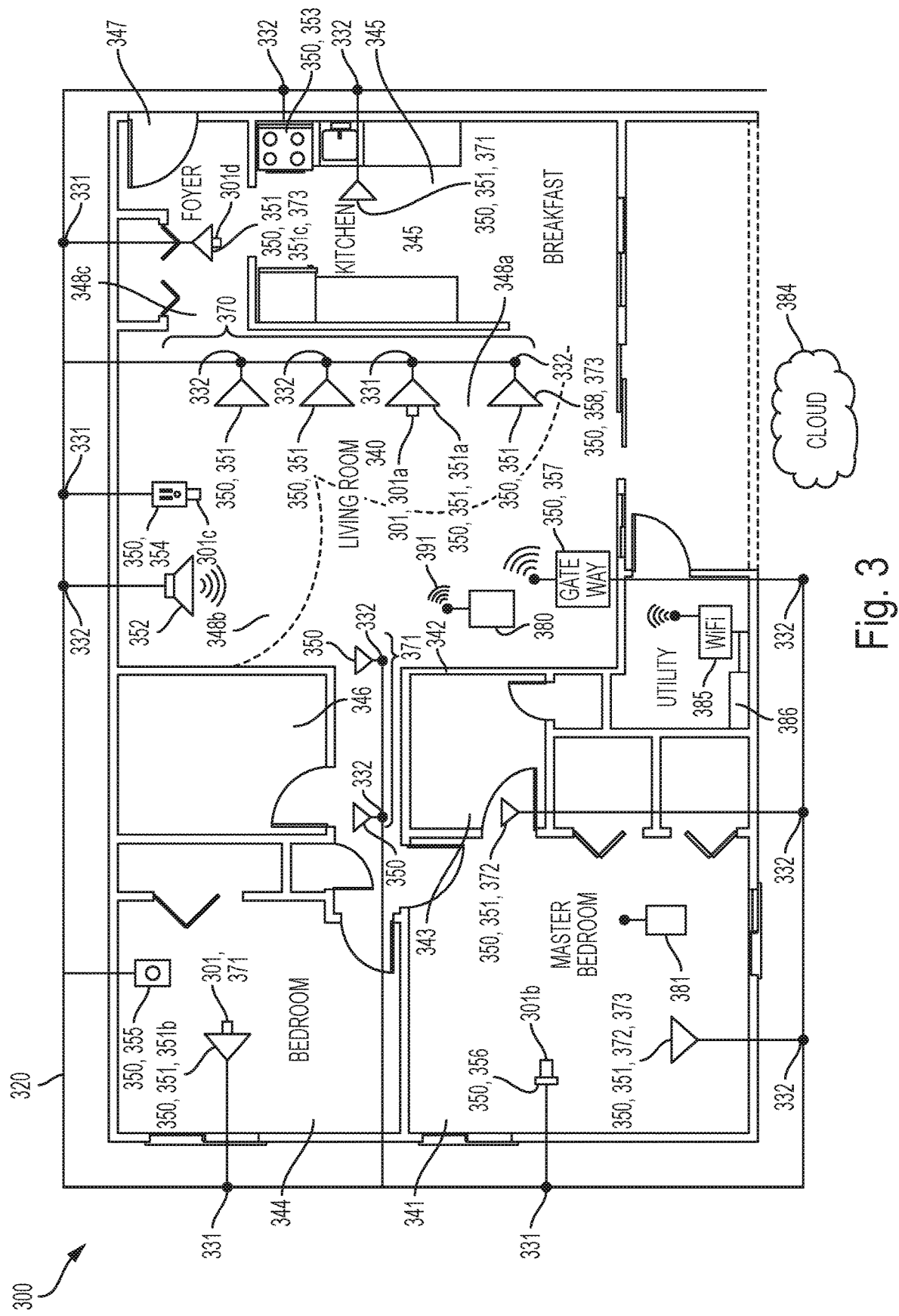
FIG. 3 illustrates one embodiment of the network of the present invention using a variety of different host devices with and without IMs.

Referring to FIG. 3, a schematic of one embodiment of a network 300 of the present invention is shown. The network comprises at least one first node 331 electrically connected to an electrical powerline 320, the at least one first node 331 comprising an IM 301 physically and electrically connected to host device 350 which is electrically connected to an outlet (not shown) on the powerline such that the IM 301 is electrically connected to the powerline through the outlet. The network also comprises at least one second node 332 electrically connected to the powerline 320, the at least one second node 332 comprising a host device 350 configured to communicate over the powerline; and wherein the at least one first and second nodes 331, 332 are configured to transmit information therebetween over the powerline 320. In one embodiment, the network 300 comprises additional devices connected to the powerline configured to receive information from the IM 301 over the powerline or to transmit information over the powerline to the IM 301. As used herein, the term "information" refers broadly to a control signal, an event signal, and/or a data signal. For example, a control signal is a command to a device on the network—e.g., "play the song"; an event signal is data regarding an occurrence—e.g., "user pressed the play/pause button"; and a data signal represents content—e.g. a song or video.

Referring to FIG. 3, one embodiment of a method of communicating on a network of the present invention is shown. A first signal is communicated between one first node 331 having IM 301a on the electrical powerline 320 and a wireless device 380 over a wireless link 391, and a second signal is communicated between the first node 331 having IM 301a and at least one second node 332 over the electrical powerline 320. The second node comprises a host device 350, as described below, e.g., a lamp 351, stereo 352, stove 353, or switch/outlet 355. The device 350 is configured in at least a first configuration or a second configuration. In the first configuration, the second signal is responsive to the first signal and the second signal controls the device. For example, the first signal may be a volume up command from a wireless device 380, and the second signal transmitted along the powerline 320 is based on that command, i.e., requesting an increase in the sound system volume. In the second configuration, the first signal is responsive to the second signal and the second signal contains data from the device. For example, the device 353 is an oven that transmits a second signal along the powerline 320 to the first node 331 having IM 301a, indicating its state—e.g. it is preheated, and the first node transmits a first signal to the wireless device 380 indicating that the oven is preheated. It should be appreciated that the distance between the first and second nodes can be beyond the ordinary range of a wireless signal.

Each of the elements above is described in greater detail below and in connection with selected alternative embodiments.

Host Device

Referring back to FIG. 1, one aspect of the invention is the ability of the IM 100 to interface with a host device 150 connected to the electrical powerline. The host device may be any device that can be electrically connected to the electrical powerline, and is configured to interface with the IM and/or communicate with the IM via the powerline. Examples of host devices include lamps, ceiling fans, luminaires, lighting fixtures, industrial/commercial/office building luminaires/lighting systems, electrical outlets, switches, dimmers, IM adapters, and appliances, such as an oven, dishwasher, coffee machine, stereo, display screen, or HVAC unit.

In some embodiments, the host device is powered by an electrical outlet, as described above. However, in some embodiments, power may come through another device. For instance, the host device may be plugged to a computer by an USB cable, and may receive power through the USB cable and send a PLC signal through the computer. Some embodiments may also use alternative power sources, in conjunction with or instead of a powerline. For example, alternative power sources included batteries (which may be used to maintain power to the device when the power line delivers no power) and wireless energy transmissions (including evanescent power transmission and inductive power transmission). Some host devices may be physically disconnected from the powerline, but may be able to communicate with another part of a network system (which is connected to the powerline) through wireless communication (enabled either by the host device itself or by an IM coupled to the host device).

Referring to FIG. 2, typically, although not necessarily, the host device comprises some functionality other than supporting the IM. This functionality may include control circuitry and, possibly, a work element for doing work. The functionality may vary considerably. For example, if the device functions as a lamp or display, then the control circuitry may comprise LED light driver circuits 257a and 257b, and the work element may be LEDs 258a and 258b driven by driver circuits 257a and 257b, respectively, as shown in FIG. 2. Many other embodiments of control circuitry and work elements are within the scope of the present invention. For example, if the host device is an appliance, such as an oven, dishwasher, coffee machine, HVAC unit, or washing machine, then the work element may be a heat source and/or motor(s) and the control circuitry would be the known electronics for powering and controlling the heating elements and/or motors(s). In yet another example, if the host device is an audio component such as a stereo or an audible alarm, then the work element may be a speaker and the control circuitry would be the amplifier and control. In another embodiment, the host device may be a control device, such as a switch, which does not have a work element, but its functionality involves the control of power and/or signals. For example, if the device functions as a dimmer switch, then the control circuitry may comprise, for example, a Zener diode. In yet another embodiment, the host device may not have a function other than to support the IM (e.g., an adapter 356 to support the IM 301, see FIG. 3).

In one embodiment, the host device is configured with ability to communicate over the powerline. Specifically, in one embodiment, the host device 250 comprises a powerline communication module 254. Power-line communication (PLC) is a communication protocol that uses electrical wiring to simultaneously carry both data, and alternating current (AC) electric power transmission or electric power distribution. It is also known as power-line carrier, power-line digital subscriber line (PDSL), mains communication, power-line telecommunications, or power-line networking (PLN). In one specific embodiment, the PLC protocol is HomePlug PLC, although it should be understood that other PLC protocols may be used. Such PLC is known in the art, and is described for example in https://en.wikipedia.org/wiki/IEEE_1901.

To facilitate the operation of the PLC module, wireless module, and/or the functional circuitry, the host device may comprise a digital processor 251 and memory 252. Such processors are well known and may be integrated into the different modules or functional circuitry described above. Depending on the sophistication of the functional circuitry and whether the host device has PLC or wireless communication modules, the processor may not be necessary.

In one embodiment, the PLC module comprises a control interface for facilitating control of the host device though the PLC module. Specifically, the control interface is a software module in the PLC module, which is interfaced with a databus for communication with the host device. It should be understood, however, that other embodiments are possible. For example, the control interface may be a discrete module or it may be incorporated into another component (e.g. an IM.)

The interface may be configured in different ways. For example, the interface may receive PLC control signals from the network—e.g., on/off, color, brightness, increase volume, decrease volume, etc., and then communicates the control signals to the host device controller such that the host device effects the command. Preferably, this interface is lightweight to reduce the cost of the hardware. For example, in one embodiment, the PLC module/interface comprises a LPC824 chip, commercially available from NXP Inc.

In one embodiment, a simple command protocol is used in connection with the control interface. For example, in one embodiment, Simple Device Management Protocol (SDMP) is used to provide a lightweight command protocol to operate host devices such as lamps and appliances. A high-level description of SDMP is attached hereto as Appendix A. Such a simple protocol facilitates the use of simple, non-propriety, and inexpensive hardware compared to IP-based communications such as ZigBee, although it should be understood, that, in certain embodiment of the invention, IP-based communication like ZigBee can also be used to control the host device.

Having a host device that is configured for PLC communication and/or wireless communication as described above in connection with FIG. 2 may be desirable as the device can operate on the network without the need for its own IM. That is, in one embodiment, only a portion of the host devices have IMs, the rest of the host devices just listen to the network. For example, as shown in FIG. 3, the network 300 comprises a number of second nodes 332 comprising host devices 350, which do not necessarily have an IM installed. In such a configuration, each of the second node host devices may controlled by a host device 350 of a first node 331, which has an IM 301. Because each second node host device is equipped with PLC functionality, it can receive operational instructions from the IM and operate accordingly. In other words, a host device so equipped is capable of listening to the network and receiving/executing commands with or without an IM.

If a host device is not intended to receive an IM, it may or may not have an interface for receiving an IM. However, in one embodiment, all host devices are configured to receive IM such that the network is flexible and the IM can be moved from one device to another or additional TMs can be added without having to change or reconfigured the host devices. Additionally, manufacturing host devices in which all have the relatively inexpensive IM interface reduces inventory requirements, and takes advantage of economies of scale.

The host device may comprise functionality to communicate wirelessly. For example, in one embodiment, the host device 250 comprises a wireless communication module (WCM) 260, which may support known wireless technologies, such as Wi-Fi, Bluetooth, Bluetooth Low Energy, ZigBee, Z-wave, cellular, and any other known wireless communication technology. The wireless device used to communicate with the WCM 260 can be any known wireless device including, for example, a tablet, smart phone, smart watch, switch, remote control, sensor, tracking device/smart tag (e.g., www.thetileapp.com), speaker, microphone, or a smart hub (e.g., http://www.amazon.com/Amazon-Echo-Bluetooth-Speaker-with-WiFi-Alexa/dp/B00X4WHP5E), just to name a few.

As mentioned above, it should also be understood that, in other embodiments, the host device does not have PLC and/or wireless communication modules. For example, as described below, the PLC or wireless functionality may be imparted to the host device through the IM.

Additionally, some embodiments may comprise components of the host device which are capable of independently receiving and reacting to information on the powerline. For example, in one embodiment, a smart display system can receive data independent from the data received through the computer whose graphics are being displayed. For instance, a smart monitor is connected to a desktop computer and also received power through the powerline. The monitor receives data through its powerline, which may instruct it to tune its emitted spectrum (for instance reduce blue content in the evening and increase it in the morning). This may enable a centralized policy for control of blue light in a building such as an office building, rather than each individual computer controlling the blue light level.

In one embodiment, the network 300 has end-to-end data encryption and fine-grained control over anonymity and data access rights. To that end, in one embodiment, the host device 150 comprises an encryption module 256, which may comprise a dedicated chip. Such chips are commercially available and often integrated into the processor chip. For example, such chips are commercially available through Microchip.

The components described above may be interconnected using known communication protocols and buses. For example, as shown in FIG. 2, in one embodiment, the processor 251 is connected to memory 252, PLC 254, and the interface 210 via Serial Peripheral Interface (SPI) bus; to encryption 256 via I²C Inter-Integrated Circuit (I²C) bus, and to driving circuitry 257a, 257b via a pulse width modulated (PWM) signal.

The host device also comprises a power supply 253. The power supply 253 is electrically connected to the AC powerline (not shown) through the electrical interface 259. It should be understood that the power supply provides power to all the components of the host device and IM requiring power, although the connection to such components is not shown in FIG. 2 for simplicity. For example, the IM receives power from the power supply 253 via interface 210. Such power supplies are well-known and may involve other known components, for example, AC to DC converters, voltage regulators, or other power line modulation circuitry.

Intelligent Module

As mentioned above, the IM 100 is electrically connected to at least one host device 150. In one embodiment, to facilitate this connection, the IM has a releasable interface 101a that connects to a complimentary releasable interface 101b of the host device. In one embodiment, the interface 101 provides for both control/data signals and electrical power. Such connects are well known, and include, for example, card edge connectors, USB connectors, Serial Peripheral Interface (SPI) connector, or other known electrical connectors. For example, in one embodiment, a simple, standard 20-pin SPI connector is used. Thus, one aspect of the invention is the ability of the IM to interengage releasably with existing devices such as lamps, appliances, audiovisual equipment, adapters, and other devices connected to the powerline.

In an alternative embodiment, the interface 101 is a magnetic interface as disclosed for example in U.S. application Ser. No. 14/543,164. In some embodiments, the interface comprises a plurality of magnets with varied polarities (i.e. some magnets point north, some point south) and varied positions. This way, the module can only be attached when the alignment of magnets on the module and the lamp are properly aligned. In some embodiments, a magnet comprises a complex pole structure, as is done in polymagnets (www.polymagnet.com). In some embodiments, the interface comprises a plurality of magnets, and some of the plurality of magnets can carry an electrical signal (power and/or data).

Although the IM and host device are depicted herein as having an releasable interface, it should be understood, that, in some embodiments, the IM may be integrated with the host device, and is not capable of being removed readily. Such an embodiment may be preferable, for example, if the additional cost of the IM compared to the host device is nominal.

In one embodiment, the IM comprises a PLC communication module 208 and/or a wireless communication module (WCM) 207 such as those described above in connection with the host device. Incorporating the PLC and/or WCM in the IM may be preferable if the host device 150 does not comprise an optional PLC communication module 155 or a wireless communication module 154. As mentioned above, the PLC is a known communication protocol that uses electrical wiring to simultaneously carry both data, and Alternating Current (AC) electric power transmission or electric power distribution. Likewise, as described above, the wireless communication module (WCM) 270 may support known wireless technologies, such as Wi-Fi, Bluetooth, Bluetooth Low Energy, ZigBee, Z-wave, cellular, and any other known wireless communication technology. The wireless device used to communicate with the WCM 270 may be any known wireless device including, for example, a tablet, smart phone, smart watch, switch, remote control, sensor, tracking device/smart tag, speaker, microphone, or a smart hub, just to name a few.

The IM comprises a digital processor 201 (or equivalently, a system-on-chip or "SoC") and associated memory 202 configured with instructions for operating the processor 201 as described herein. In one embodiment, the memory is operatively connected to the processor and configured with instructions for causing the processor to receive and transmit information over the powerline through the powerline communication module. The hardware configuration of the processor and memory is well known and thus is not described herein in detail.

In one embodiment, one or more of the components described above are integrated in a single chip. For example, in one embodiment the digital processor, memory and Bluetooth wireless module are integrated in a common chip. Such modules are commercially available (e.g., BMD300 from Rigado which uses NFR52 series SoC chip.) In one embodiment, the BMD300 is modified with a card edge connector to facilitate its plugability in the host device. The memory can be configured to meet the application requirements. For example, in one embodiment, 64 k RAM and 512 k flash memory is used.

The components described above may be interconnected using known communication protocols and buses. For example, as shown in FIG. 2, in one embodiment, the processor 201 is connected to memory 202 and the interface 210 via SPI bus; and to the various sensors in the sensor module 203 using different links, including, for example, I²C bus, analog, or SPI bus In one embodiment, the processor 201 operates in at least one of two modes, a first mode and a second mode. In the first mode, the processor receives a command signal over either a PLC module or a wireless module, and then transmits the command signal or a version thereof to the host device to control the host device. For example, the IM may be connected to a lamp host device, and receive a control signal to dim the lamp from another device on the powerline or from a wireless device, in which case, the IM would control the functional circuitry of the lamp to dim the lamp. In another example, the IM is interfaced to an energy provider as a brownout protection energy-monitoring device. In a brown out situation, the grid is not able to provide enough power to users and a reduced amount of power is provided. In this situation, the IM communicates with the energy provider, through, for instance, the cloud. When the energy provider predicts a likely upcoming brown out situation, it communicates to the IM a request to lower the overall consumption in the home. This can be done by the intelligent network, for instance by prioritizing some functions and shutting down non-essential functions or devices with the objective being that, if enough homes comply with the request, brown-out or back-out can be avoided.

In the second mode, the processor obtains data from a data-generating module 103, and then transmits the data or a signal based on the data over either the powerline through the PLC module or wirelessly via wireless communication module. As discussed below in detail, the data from the data gathering module may be, for example, sensor data, audio/visual data, or data of the of host device. For example, the data may be sensor data relating to occupancy, and the IM may transmit a signal to reduce/increase output based on occupancy to the other lamps in a specific group on the powerline. It should be understood that, in addition to signaling other lamps in a specific group on the powerline to reduce/increase output, the IM may also control the host device to reduce/increase output.

Data Gathering

In one embodiment, the IM comprises a data gathering module 203, which functions to gather data for transmission through the IM 200 over the powerline or wirelessly. The data gathering module 203 has a variety of different embodiments, and may include, for example, sensors, audio/visual devices, host monitor interface, and a third party monitor. In one embodiment, a group data gathering devices are configured in single module. For example, referring to FIG. 2, in one embodiment, a microphone 204, a passive infrared detector (PIR) 205 and an ambient light sensor (ALS) 206 are package in the data gathering module 203 which is configured to interface with a Bluetooth module containing a processor as mentioned above. This combination of sensors has been found to be effective in facilitating smart lighting. It should be understood that other combination may be used to facilitate other applications. For example, in one embodiment, a PIR, microphone and netcam are packaged in a module used for a security or surveillance applications.

In one embodiment, the data gathered by the TMs (or any communication from the IM) is secured using a public key infrastructure (PKI). This is hardware-based device authentication. It has end-to-end data encryption and fine-grained control over anonymity and data access rights. To that end, in one embodiment, the system 200 comprises an encryption module 256. In the embodiment shown in FIG. 2, the encryption module 256 is disposed in the host device, although other configurations are possible. For example, the encryption functionality may be disposed or integrated in the IM, or exist as a standalone component.

Below is a brief description of some of the various sensors that can be incorporated into the IM of the present invention. Still other data gathering devices will be known to those of skill in the art in light of this disclosure.

a. Occupancy Sensor

For example, in one embodiment, the IM 100 is configured to determine occupancy of a certain room or space within a building or home. Occupancy tends to be an important parameter in determining when to light a space or adjust the temperature of the space. Because the network of the present invention uses the outlets of the powerline which tend to be very numerous, the network has the ability to collect high resolution data of occupants from many different locations within the home or building.

Occupancy sensors are well known in the art. For example, in one embodiment, the occupancy sensor may be an infrared motion sensor, which relies on movement to determine the presence of an occupant. In one particular embodiment, the occupancy sensor is a passive infrared sensor (PIR sensor), which is an electronic sensor that measures infrared (IR) light radiating from objects in its field of view. Suitable motion sensors are well known, and commercially available from, for example, Murata.

Alternatively, in one embodiment, the occupancy sensor may determine occupancy through a thermal profiling of occupants in the space. Such an approach may provide for more reliable results than an infrared motion sensor as it can use heat profiles to distinguish between different animals that may occupy the same space or a room. Specifically, many homes have pets such as cats and dogs which may trigger an ordinary motion sensor—which uses, for example, infrared motion detection—and, thus may indicate that the space or room is occupied and thus, turn on lights or adjust the temperature of the room even though the pet or animal is indifferent to the temperature or light of the room. Accordingly, in one embodiment, the IM includes a sophisticated occupancy sensor, which determines occupancy based upon a heat profile of a human. Suitable movement and occupancy sensors are well known and commercially available from, for example, GOOEE. In yet other embodiment, occupancy is determined by a software-defined 3D imaging sensor. See http://www.vayyar.com. Still other occupancy sensors rely on radar or sonar technology. In one embodiment, the sensor using one or more lenses to increase its field of view.

b. Light Sensor

In another embodiment, the sensor of the IM comprises a light sensor. The light sensor can be used to either sense the intensity of the light or the quality/spectrum of the light. For example, it is generally preferred from an efficiency standpoint to decrease the light output of lamps when natural sunlight in the room is relatively high. An ambient light sensor (ALS), which measure the level of ambient light (e.g., natural sunlight), are well known and commercially available from, for example, Silicon Labs.

In other embodiment, the quality of light (or equivalently, the spectrum of light or a quantity derived therefrom) is monitored to provide for therapeutic light dosages to correct for eye conditions or to control circadian cycles. Such applications are disclosed, for example, in US Patent Application Publication Nos. 2016/0341436 A1, 2017/0361124

A1, and 2016/0339203 A1, hereby incorporated by reference. Suitable spectral sensors are well known, (for instance spectrometers) and commercially available from, for example Ocean Optics.

c. Heat Sensors

In another embodiment, the sensor is a heat sensor for monitoring the temperature of rooms. Knowing room temperature is important for regulating the hear/air condition throughout the house of building. Additionally, when the temperature data is combined with occupancy data, the home/building can be heated/air-conditioned more efficiency. Heat data can also be used to determine if there is a fire or potential for a fire. Such heat sensors typically comprise thermostats, thermometers, infrared detectors, or other known heat-detecting devices. Suitable heat measuring devices are well known, and commercially available from, for example, Silicon Labs.

d. Sound Sensor

In another embodiment, the sensor is a sound sensor. For example, a user may want to have sound detectors in the nursery or children's room to know when the baby/child is awake. Alternatively, hearing-impaired people may want to use a sound sensor to detect a doorbell, alarm clock or other audible signal. Even people who live in larger homes may need a sound sensor to detect sounds which otherwise would be inaudible. Suitable sound sensors, such as microphones are well known, and commercially available from, for example, Knowles. The IM could be programmed to flick lights or otherwise send a signal upon detection of sound.

In one embodiment, the IM is equipped with a microphone which not only detects sound as described above, but also records audible instructions which then can be processed to generate commands for any of host devices on the network. The processing of the audible instructions is known, and may be done in various ways, including, for example cloud processing (as discussed below), or through a local voice recognition module.

e. Biometrics Sensor

In another embodiment, the sensor is configured to measure biometrics (e.g., heartbeat and heart rhythm) of an occupant. For example, the IM may be configured with a sensor to detect heartbeat and heart rhythm and therefore to monitor the human and to properly alert the human or emergency staff of a potential health issue. Such an application may be preferable in hospitals or in retirement homes where the health of the occupants can be an issue. Suitable biometric sensors are well known, and commercially available from, for example, Modern Device.

f. RFID Sensor

In yet another embodiment, the sensor is radio frequency identification (RFID) reader for locating and identifying RFID tags. For example, RFID tags (preferably, but not necessarily passive RFID tags) may be attached to an object to track and account for the object in the building. Such a sensor may be used for locating misplaced objects, tracking pets and children (collars and clothing), and even monitoring items to ensure proper inventory levels or to monitor for theft.

g. Misc. Sensors

Still other sensors may be used to detect moisture/humidity or to measure various risk or threat factors, including noxious gases such as smoke, carbon monoxide, radiation levels, etc. Such sensors are well known and commercially available.

h. Third Party Sensors

In another embodiment, the sensor may be a third party sensor for providing information to a third party such as the government or a utility. For example, one embodiment, the sensor is a seismic sensor to sense movement of the home or building. Such data can be used to warn the occupants of an impending earthquake, or such data can be transmitted to the cloud or other third party, which collects seismic data from different sources to determine seismic patterns, which may be indicative of a seismic event such as an earthquake. Suitable seismic sensors may include accelerometers or other devices configured to sense motion, which are well known and commercially available from Wilcoxon. Another example of a third party sensor may be an energy provider sensor for gather data regarding energy usage. Still other examples of third party data gathering will be obvious in light of the present application.

i. Audio/Visual Monitoring

The data-gathering module 203 may comprise audio/visual/audiovisual equipment such as a microphone, still camera or video camera for recording images and/or sounds. Such microphones and cameras are well known, and include for example Internet cameras/Webcams. The camera may be used to image in the visible light spectrum or in the electromagnetic spectrum outside of the visible light spectrum (e.g., infrared). Additionally, the camera may have other functional controls such as pan/tilt/zoom, which may or may not be controlled by or through the IM.

Intelligent Module Control of Host Device

In another embodiment, the IM functions to interface with the host device to gather data and/or to control the host device. Specifically, the IM may be configured to gather data from the host device including, for example, alarms, operational parameters (e.g. operational temperature, operational time, efficiency, intensity, etc.) and/or it may be configured to transmit commands to the host device such as commands to alter the operational parameters (e.g., turn on/off, turn up/down). The distribution of the information gathered or the commands may be enhanced by virtue of the IM, in one embodiment, being able to network over the powerlines using PLC as described herein. For instance, the IM may use information gathered on the network (e.g., occupancy data) along with machine learning (e.g., when occupants use bathroom after a certain time in the morning, they stay awake) to operate the host device (e.g. coffee machine) in a more efficient/convenient manner (e.g., start coffee machine when occupants enter bathroom after the certain time in the morning).

In some embodiments, the IM augments the computing power of the host device. For instance, the host device may be a refrigerator or dishwasher with sufficient computing power to perform its standard function (maintain a given temperature profile, or go through a programmed wash cycle). However, the computing power is not sufficient to perform advanced computing functions (send or receive commands with a smart network, run complicated instructions, etc). In such embodiments, the IM provides such additional computing power. For instance, the IM may bring network communication functionality, thereby enabling the host device to "talk" to other devices on the network and turning the host device into a smart appliance. For example, a dishwasher receives an IM, which connects to a smart network with motion and presence sensors. When the artificial intelligence of the network determines that everybody has left the home, it sends that information to the dishwasher to start the washing operation if the dishwasher is full enough.

Another use case would be tighter integration with a smart/grid/smart city, where the grid can ask a device to enter a lower power state, or to hold off high power functions, allowing better brownout recovery or prevention. The PLC capability here makes this very feasible, and lower cost than any other solution that would previously require a bridge from the powerline to another network medium. This potentially introduces smart devices to be a members of multiple communities (i.e. home, its vendor clouds, partner clouds, and the local power grid).

In a basic embodiment, the IM is configured for attachment/connection to a host device such as an appliance (e.g., coffee maker, oven, dishwasher, etc.), and comprises a PLC module for communicating over the power line and, optionally, a wireless interface for communicating wirelessly. Additionally, the IM comprises a processor and memory of sufficient capacity to operate the appliance. The processor/memory is also configured with an appliance interface, which may be software based or firmware based, as discussed below.

The appliance interface may have various forms. For instance, it may be configured to communicate with the device using basic analog or digital signals—such signals can emulate the signals sent by the host device's hardware control interface (such as keypad/analog buttons etc) to its MCU. This may be advantageous if the host device has an MCU with minimal amount of computation power and can only receive such basic data structures. On the other hand, the interface may be configured to communicate using strings of text (or other digital messages) which can be interpreted by the host device's MCU/CPU. This may include basic commands ("start the appliance") or complex commands ("run the following washing program").

Figure 7A:
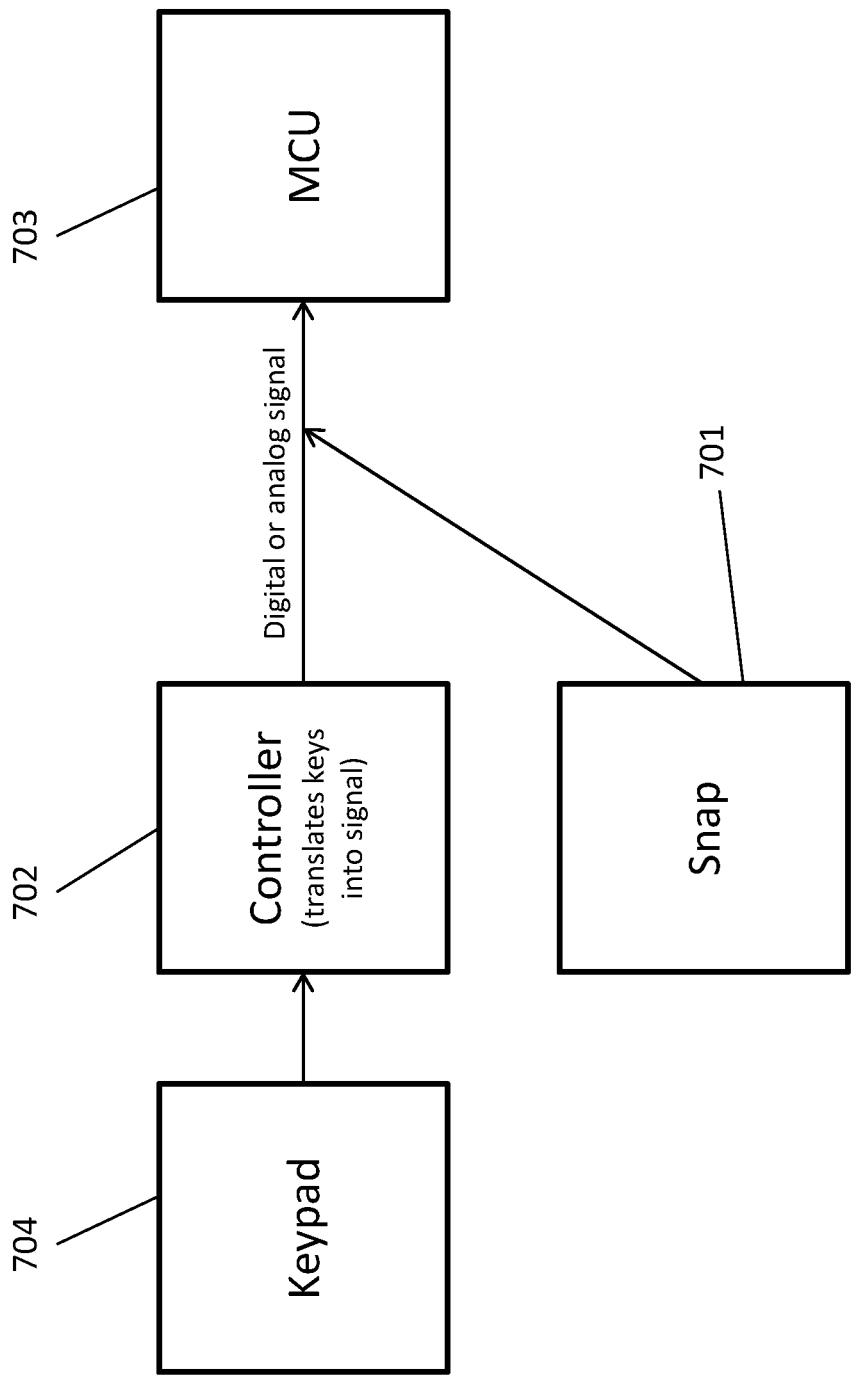
FIG. 7A shows one embodiment of the interface of the IM with a host device for controlling the host device.
Figure 7B:
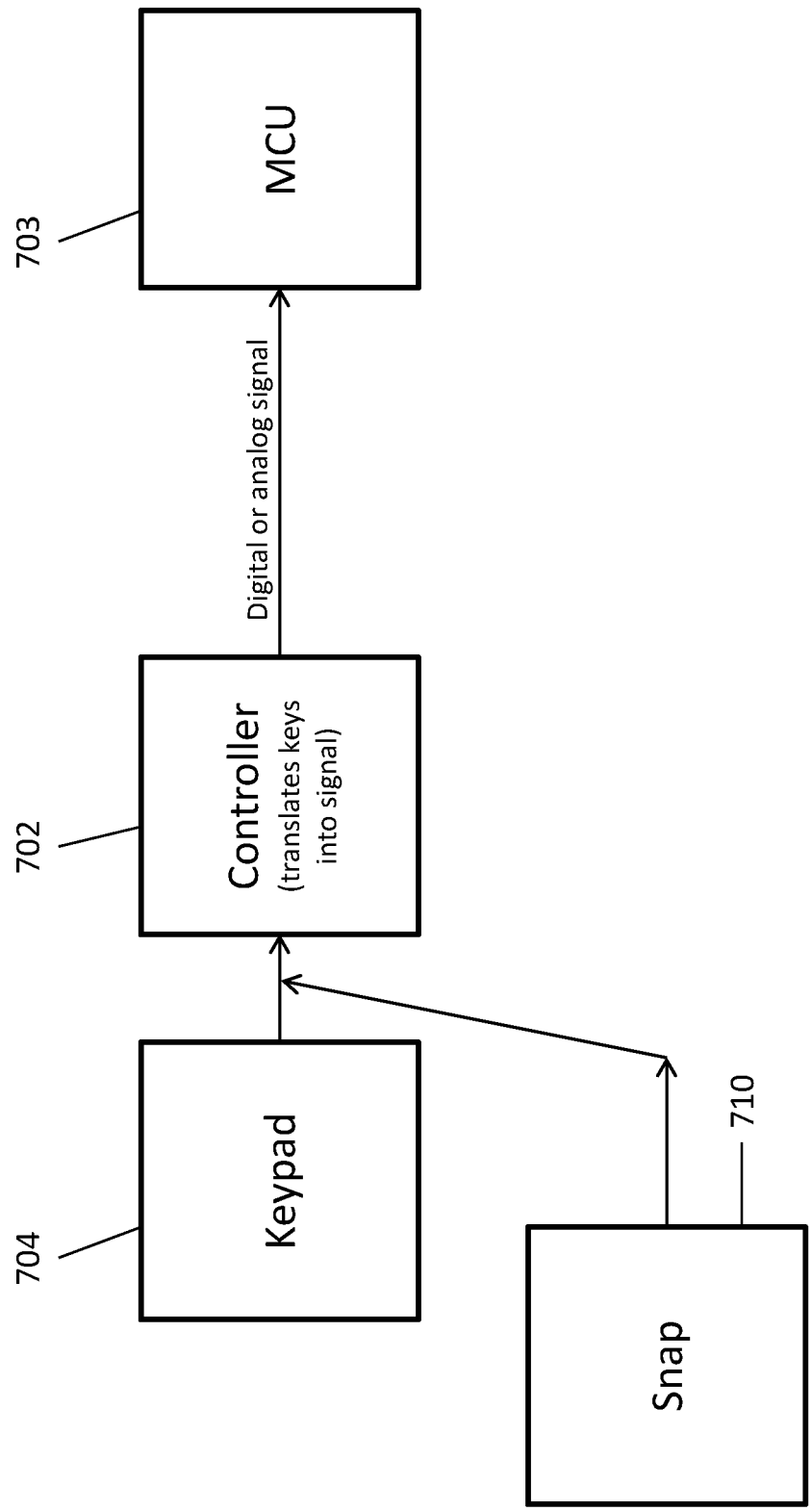
FIG. 7B shows another embodiment of the interface of the IM with a host device for controlling the host device.

The IM may communicate with the appliance in different ways. For example, referring to FIG. 7A, the IM 701 may be configured to interface with the host device between the keypad controller 702 and MCU 703 of the device such that the IM communicates directly with the MCU, effectively bypassing the keypad 704 and keypad controller 702. Such an embodiment may be preferred as it enables the IM to have functionality that goes beyond the functionality of an ordinary keypad. In other words, rather than just being a surrogate for the keypad, the IM may impart additional functionality to host device/appliance. Alternatively, as shown in FIG. 7B, the IM 710 may interface with a host device between the keypad 704 and the keypad controller 702 as shown. Such an embodiment may be preferred from a simplicity standpoint, as the interface would simply emulate the keypad. Still other approaches will be known and obvious to those skilled in the art in light of this disclosure.

In one embodiment, the interface is based on an application programming interface (API) provided by the host device manufacturer. Such APIs are well known and the programming for the interface based on the API is readily performed by one of skill in the art.

As indicated above, the interface may be either software based or firmware based. If software based, the interface instructions (such as instructions for the host device to perform a task) are usually stored in memory, although how the interface instructions are obtained and stored in memory can vary. In one embodiment, the IM interrogates the host device, and obtains the interface instructions from the host device. Alternatively, the IM may determine the identity (e.g. model) of the host device, and then communicate over the power line via PLC and/or wireless interface to download instructions from the cloud or other source. In yet another embodiment, the IM is preloaded with instructions that may be generally universal among host devices of particular sort (for instance, the IM has preloaded instructions for numerous appliances from a given brand). In another embodiment, a particular IM can be used for particular host device in which case the IM is preloaded with an interface specific to the particular host device.

In yet another embodiment, the interface is part of firmware within the IM. Such a configuration is well known to those of skill in the art in light of this disclosure. As with an IM preloaded with a software interface as described above, an IM which uses firmware for the API may be particular to the type of host device it is plugged into.

Once the IM is plugged into a host device, the interface is configured to control the host device and the IM facilitates communication over the network using a variety of different protocols including, for example, SDMP as described herein.

In some embodiments, once the host device becomes capable of network communication through the IM, this connectivity is used to update the firmware of the host device (for instance, by connection to a cloud network). In one embodiment, this update step is initially performed as soon as the IM is connected, and the firmware update makes the host device capable of functioning with the IM. In some embodiments, this update procedure is made secure thanks to the use of secure communication.

In some embodiments, the host device is not always plugged to a powerline. For instance, the host device is a camera operating on a battery. In such embodiments, the host device may acquire powerline connectivity when it is plugged to a wall for charging; for instance, when the camera is plugged for charging, it also becomes capable of sending files over the PLC. Alternatively, the IM may enable wireless communication of the host device—for instance, once the IM is plugged, the camera becomes a wireless camera which can share files over a Wifi/Bluetooth network.

In one embodiment, the IM has a crypto chip to facilitate block chain communication between the host device appliance and the cloud.

In one embodiment, the host device has an identification chip, for example, flash memory with an ID string. This allows the IM to identify the host device, and, optionally, to verify the identity through a third party key provider. Such an approach is preferable to ensure that the IM confirms the identity of the host device. Confirming the identity of the host device is important for at least a couple of reasons. First, it is important to understand for certain the functionality/nature of the host device for safety reasons. Otherwise, the IM might control the host device in a way that is not consistent with its safe operation, possibly causing damage to the device and/or the building in which it is disposed. Accordingly, understanding and verifying the identity of the host device is important for operational safety. Additionally, in one model, it is important to ensure that host device is manufactured by an authorized "licensee" of the IM protocol and interface. In other words, in one business model, appliance owners pay a license fee to enable their devices to be networked on a smart network via the IM. As described below, there are a number of reasons why an appliance manufacturer would pay such a fee to avoid the need to provide networking functionality on their own. Therefore, it is important in this embodiment to verify the identity of the host device manufacturer.

The manufacturers of host device have a number of incentives for configuring their devices for connection to an IM as described herein. First, the IM relieves the manufacturer of the need to provide network functionality in the host device, which includes not only hardware (e.g. network communication card, PLC and/or wireless interface), but also software and the associated updates and patches. Rather with the IM, a third party provides the hardware, monitors and updates the software, and administers/manages the network protocol (e.g., SDMP).

In addition to the IM integrating the appliance/host device onto a network and thereby facilitating its remote/intelligent control, the IM also facilitates updating the software of appliances/host devices. That is, because the IM provides for a connection to the Internet/Cloud, important updates, patches and other software revisions can be readily downloaded from the cloud and installed in the appliance, thereby, avoiding the need for recalls or for service personnel to make service calls which can be prohibitively expensive. In one embodiment, this update step is initially performed as soon as the IM is connected, and the firmware update makes the host device capable of functioning with the IM. In some embodiments, this update procedure is made secure thanks to the use of secure communication.

Yet another advantage of using a removable IM is that the IM enables the host device to maintain state-of-the-art security. Because the IM is removable from the host device in one embodiment, it may be updated/replaced as security evolves. That is, unlike an appliance which may last 30 plus years, cryptography is evolving and may need to be updated once every couple of years, if not more frequently. For that reason, having a removable IM which is updated periodically is far more convenient for an appliance manufacturer. For example, a new IM having a state of the art crypto chip can be installed without disturbing the appliance, alleviates the host device manufacturer from having to update and maintain cryptography, which is its own specialty, and most likely beyond the competence of a traditional appliance manufacturer. In some cases, use of secure connectivity is paramount—for instance in the healthcare sector or in government-related settings. In such cases, use of a standard IoT device may be unacceptable due to the low level of security provided. Likewise, use of a simple accessory which adds basic network capability (such as a Wifi/Bluetooth dongle) and/or basic connection to the internet may be unacceptable due to the lack of security. Embodiments of the invention solve for this lack and provide connectivity with end-to-end encryption.

In some cases, the IM has an ID key which is designed to only function with one specific device having a specific ID. This enables the deployment of host devices without networking capabilities, which can then be network-enabled in targeted fashion after the fact.

In addition to alleviating the manufacturer from network expertise and maintaining cryptographic software, the IM also alleviates it from the burden of establishing secure manufacturing processes, such as identity provisioning and device signing in a factory setting. This should increase ecosystem security as large firms with the most expertise will handle this, rather than everyone (including young/inexperienced firms) providing their own implementation and storing keys in an unsecure fashion without even knowing it.

One example of a possible initial sequence when the IM is plugged is as follows:
1) Electrical connection is made and snap is powered by the device through that connection.
2) Snap boots up.
3) Snap sends signed security credentials to the device to establish its identity.
4) Device verifies those credentials as valid credentials.
5) Device sends signed security credentials to the snap to establish its identity.
6) Snap verifies those credentials as valid credentials.
7) Once two way verification is complete, the Snap will interrogate the device to ask what network services it supports. So, for example, a coffee maker would tell the device snap that it supports "the coffee making service".
8) The device snap will then attempt to register the device on the network, again doing the two way verification between itself and whatever controller device on the network that handles network operations, organization, etc.
9) Once the device snap has registered the device on the network, it is ready to accept commands from the network to access the defined service as specified by the device.
10) The device is now on the network providing the network service specified and administrators of the network are then notified of the presence of the new device, as are other devices on the network which may want to interact with that service.

Crytographic keys can be changed via a connection to the cloud to either add newly created keys (hence allowing connections in steps 5-6 OR Step 7-8) or revoking keys (hence no longer allowing new connections from other devices in Steps 5-6 or Step 7-8).

Figure 4:
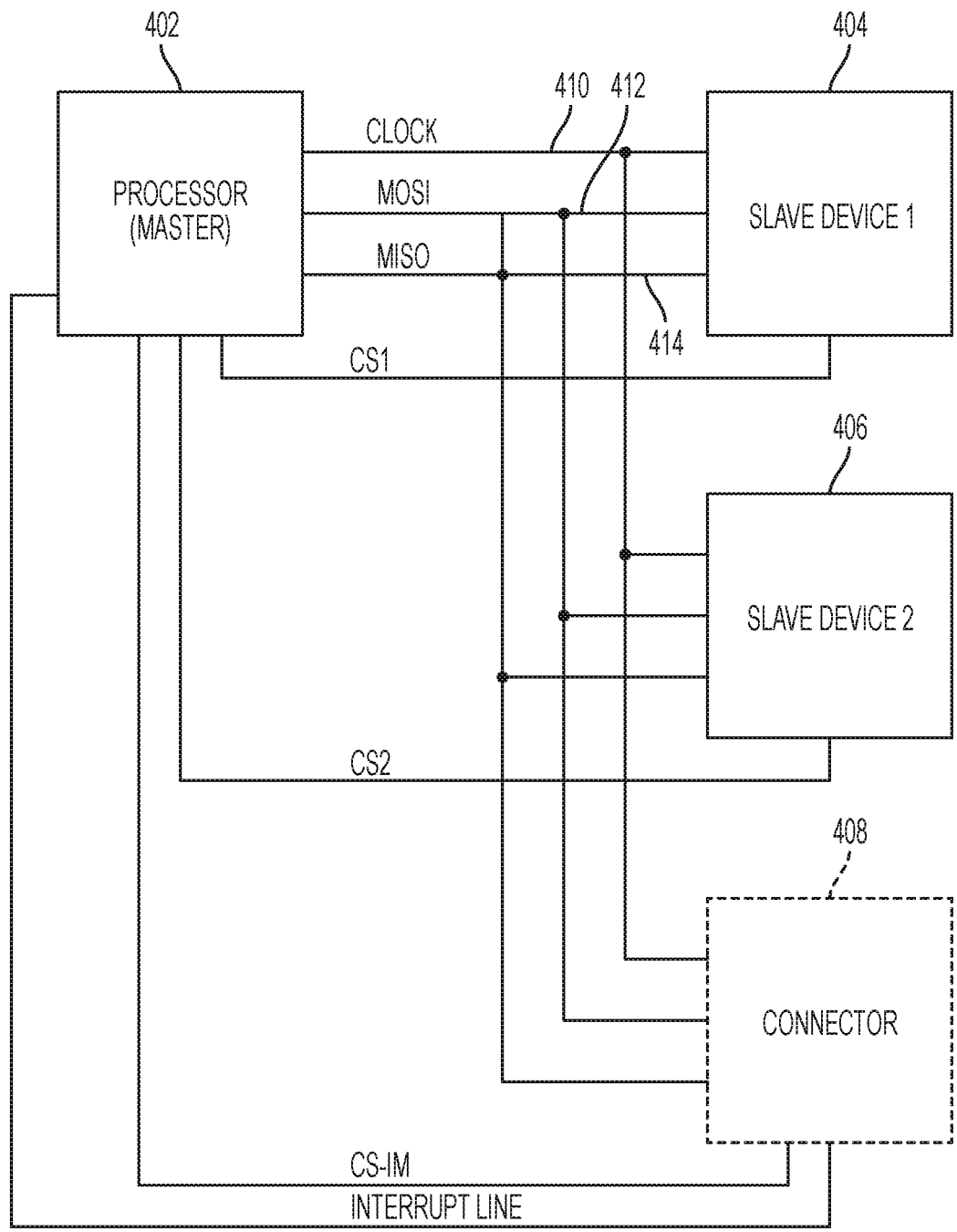
FIG. 4 shows is a block diagram of a host device in which the host's processor is the master of the device.

In some embodiments, the control of the host device is handed off to the IM when the IM is installed. This can be accomplished in a number of ways. In the embodiment of FIG. 4, the processor 402 of the host device is a master device and communicates with one or more slave devices, 404 and 406. Processor 402 provides a clock signal through a Clock line (410), to each slave device, communicates commands and data to each slave device through a Master Out Slave In (MOSI) line (412), receives data from each slave device through a Master In Slave Out (MISO) line (414). Processor 402 selects a slave device to interact with through a channel select line, CS1 or CS2. For example, by toggling CS1, slave device 1 may be selected and by toggling CS2, slave device 2 may be selected. The embodiment of FIG. 4 further illustrates a connector 408, and corresponding data lines. In the illustrated embodiment, no module has been connected via the connector. Processor 402 monitors the signal polarity on the interrupt line, Int. line, to determine when a module, such as an IM, has been connected.

In one embodiment, slave device 1 404 is a networking module configured to communicate with other devices. The networking module may be configured to communicate over a power line using a power-line communication method. For example, the networking module may be a PLC module such as PLC module 254 or 208. In various embodiments, the networking module may be configured to communicate using a wireless method or a wired method. Processor 402 selects the networking module by toggling the corresponding channel select signal, e.g., CS1. Once the corresponding channel has been selected, commands and/or data are communicated to the networking module via the MOSI line 412, and data is provided to processor via the MISO line 414.

Figure 5:
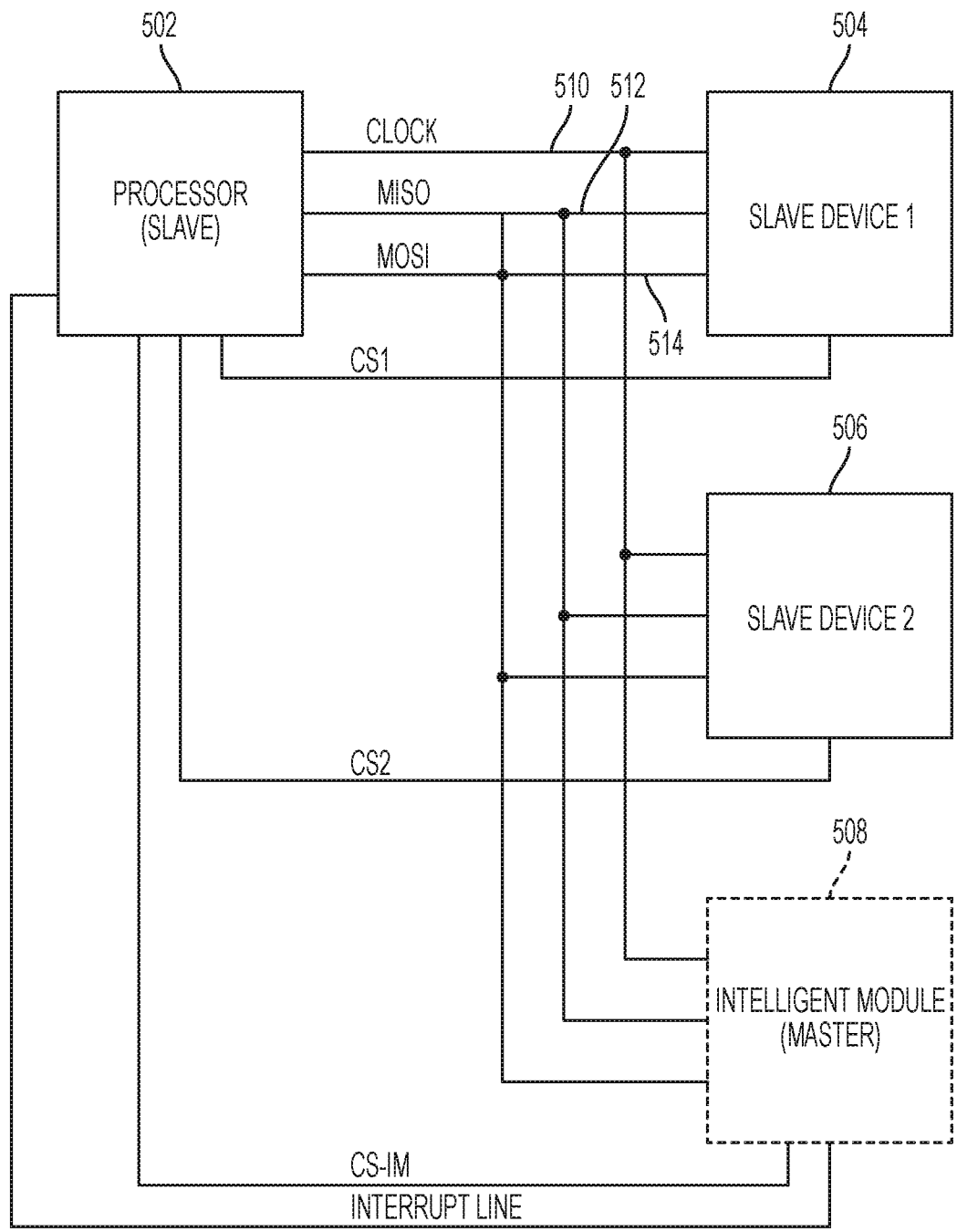
FIG. 5 shows a block diagram of a host device in which the host's processor is a slave to the IM's processor.

In the embodiment illustrated in FIG. 5, an IM 508 is connected to processor 502. As stated above, the processor monitors the signal polarity on the interrupt line, Int. line, to determine when an IM is connected to the system. When connected, the IM 508 toggles the interrupt line to communicate to the processor 502 that the IM 508 has been connected. Once the IM is detected, processor 502 switches from acting as a master device to acting a slave device, thereby passing master responsibilities to IM 508. Additionally, the MOSI and MISO lines are re-routed such that the processor communicates with the IM in the same way as the other slave devices in the system. The MOSI and MISO lines may be re-routed internally within the processor or by using one or more external switching devices to reroute the signals. Referring to from FIGS. 4 and 5, the order in which the MOSI and MISO lines at the processor have been switched can be seen. Further, the processor communicates to the IM which slave devices are connected, the capabilities of those slave devices and identification information for each slave device.

The IM send commands using communication line 512 to each slave device and receive data from each slave device via communication line 514. Intelligent module may further provide a clock signal via 510 driving the clock signal of the system. In one embodiment, to select the slave device 1, the IM instructions to the processor to select the channel corresponding to slave device 1, e.g., CS1. Once the slave device 1 is selected, the IM is able to communicate directly with the slave device 1 via communication lines 512 and 514.

This provides the IM 508 with a direct high-speed connection with each slave device without having to have the processor 502 act as an intermediary between each slave device and the IM 508. The processor 502 may be bandwidth limited due to memory or speed limitations, limiting the rate at which the processor is able to receive and communicate data. For example, the processor may lack sufficient memory to buffer large data packets, limiting the communication data rate between the processor and the IM. In such an embodiment, the processor may be able to provide data to the IM at a data rate of about 1 MHz, while the networking module is able to provide data at a rate of about 8 MHz or faster. Therefore, by communicating directly with each slave device, the IM is able to transmit and receive data at higher data rates. Thus, direct connection allows for data to be communicated to the IM at a higher rate than if the processor first received data and communicated the data to the IM. For example, when IM 508 comprises a camera capable of streaming high definition video to another device within the network, the IM 508 communicates the video data directly from the camera to a networking module (slave device 1 504) at a higher rate than first sending that data to the processor 502 and then from the processor to the networking module. This allows for higher quality video requiring a higher data transmission rate to be streamed.

In one embodiment, the IM 508 receives commands via a networking module (slave device 1 504), decodes the command and provides the decoded command to the corresponding electronic component. For example, the IM 508 receives a first command from the networking module, decodes the command and determines that the command corresponds to the lighting component of the host device. The IM may then communicate the decoded command to the lighting component. The IM may also provide un-decoded commands to the host device. The IM may receive the command via a networking module, identify that the command corresponds to an electronic component of the host device and communicate the un-decoded command to the appropriate component or to the processor 502 of the host device for decoding and further communication to the corresponding component.

Integrating IM System With Legacy Control System

In one embodiment, the IM is configured to interface with a legacy control system. Such control systems include, for example, hard-wired controls using a protocol such as 0-10V, DALI or DMX. These controls may include dimmers, occupancy/vacancy sensors, etc. Typically, the controls send information on a set of electrical lines, which are separate from the power line. Such controls may be wired directly to a device (for instance a dimmer connected to a light source), or they may be connected to a legacy central control system (LCCS) which receives input from controls and dispatches instructions to devices, based on control input and other input (software settings, time of day etc). The LCCS may be a computer-based system which regulates controls in a building.

Because existing buildings may be equipped with such legacy controls and wiring, it may be desirable for embodiments of the invention to be compatible with these. This can be accomplished in a variety of ways. In some "hardwired" embodiments, the host device to which the IM is connected directly accepts connection to the legacy control system (for instance, an extra two wires can be connected to the host device). The IM then considers the data input from the control system, in addition to data input from other data sources (including powerline and wireless, as discussed elsewhere in this application). The connection to the host device may be via an intermediate processor to process the control signal, or the connection may be direct to a standard driver in a host device accepting such connections. Such embodiments may advantageous in cases where a building is already hard-wired with such a legacy system. Hardwired embodiments may connect to any node of the legacy control system, such as an individual control (e.g. a switch) or a LCCS.

In "unwired" embodiments, the legacy control system is connected to an intermediate system, which receives control data from the legacy system and sends a data signal to the intelligent system using a different communication protocol. For example, in one embodiment, a gateway receives one or more hardwired connections from a legacy control system. The gateway then translates the control data and sends a signal to the IM via a powerline or wireless protocol. Such embodiments may be advantageous because the legacy hardwired connections are only made to the gateway.

Figure 6A:
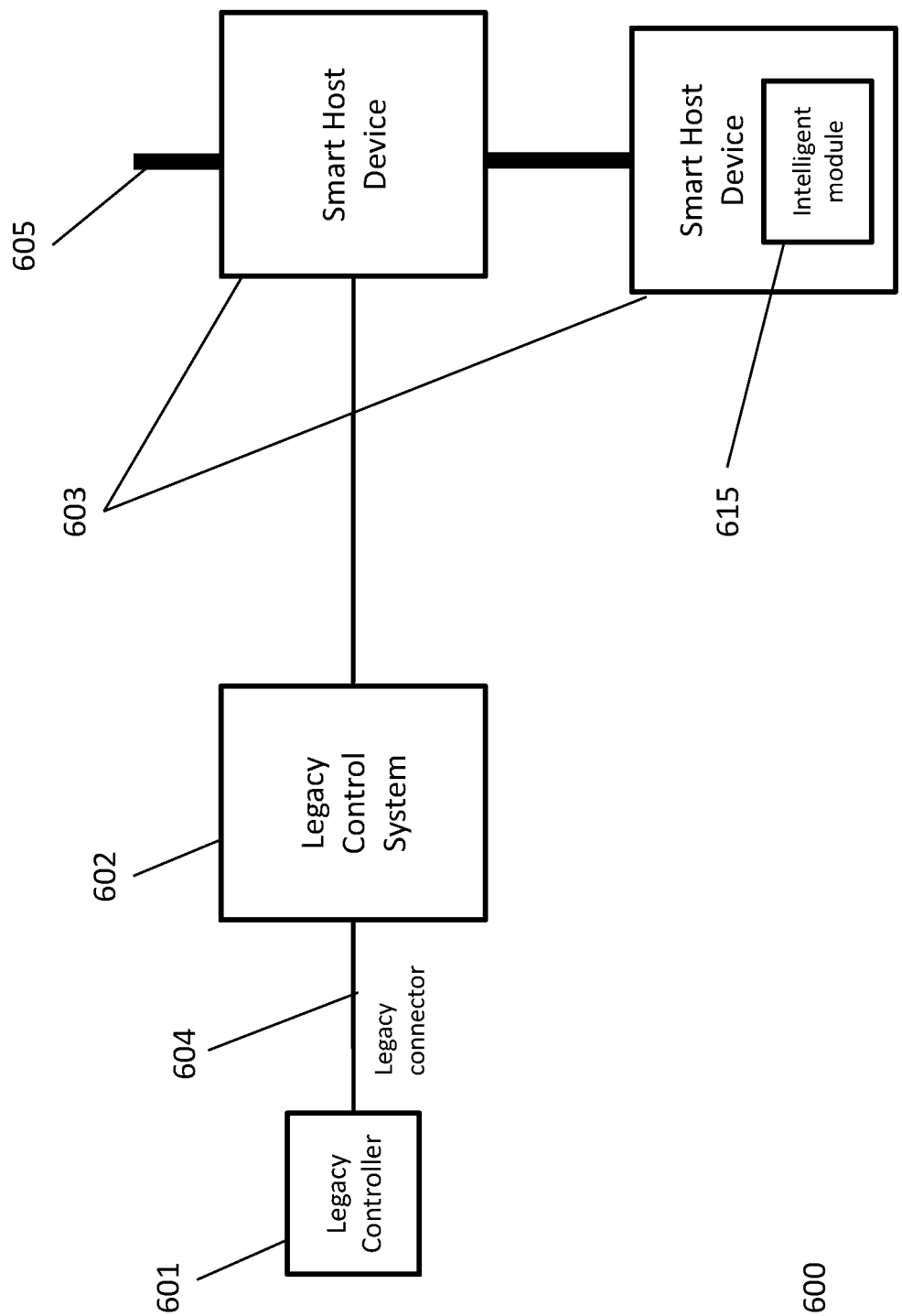
FIG. 6A shows an embodiment of the system of the present invention interfaced with a legacy control system.

FIG. 6A shows an embodiment with connection to a legacy control system. A legacy control 601 is connected to a legacy central control system 602 through a legacy connection 604 (such as 1-10V, shown as thin connecting lines). The legacy system is further connected to one of the smart host devices 603. The smart host devices are connected through powerline 605 (shown as thick connecting lines); the powerline further extends to other elements (not show). One of the host devices comprises an intelligent module 605. Here the legacy system sends control instructions directly to the host devices, which may be lighting systems.

Figure 6B:
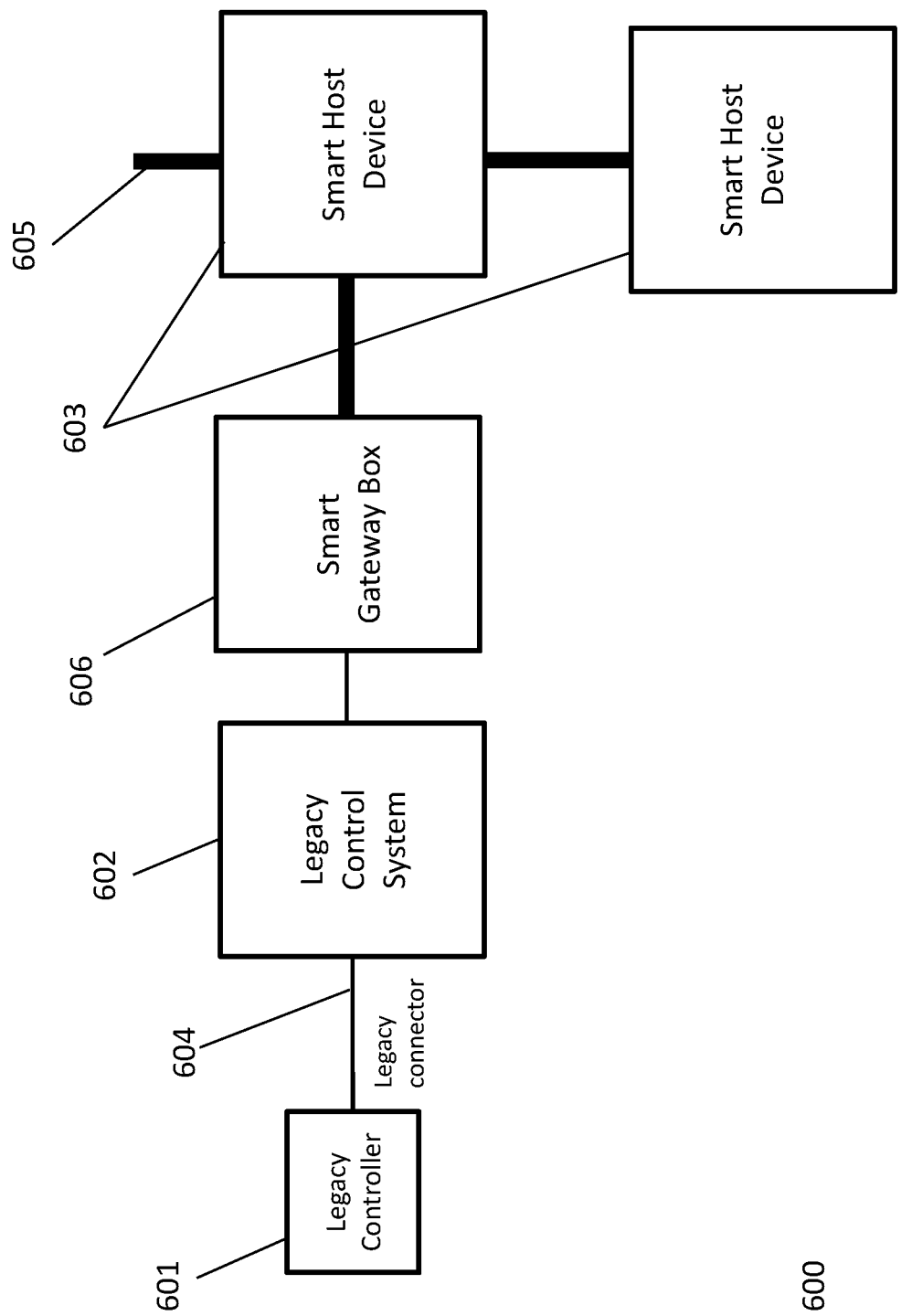
FIG. 6B shows an alternative embodiment in which a smart gateway box is used.

FIG. 6B shows an alternative embodiment where a smart gateway box 606 is used. Here the gateway connects to the legacy system and dispatches legacy instructions to the rest of the smart system. The smart hosts connect to the gateway through powerline. In this case, an intelligent module may be present in one of the smart elements (including 605 or 606), or the system may be self-contained without an intelligent module being necessary (for instance if each component has a PLC communication chip and processor).

In some embodiments, wireless communication can also be used between some of the network elements. In some embodiments, the smart gateway 606 and smart hosts 605 are deployed in a building without being connected to a legacy control system. In such cases the smart gateway box may act as the brain of the network, receiving instructions (for instance wireless instructions) and dispatching them to other elements.

The IM can process data from the legacy system in various ways. For example, the data from a legacy system may be one-dimensional (for instance the position of a dimming control), whereas the IM is able to modulate the emitted light along more than one dimension or one parameter (i.e. vary light intensity independently form the spectral power distribution (SPD) shape or the correlated color temperature (CCT)). In one embodiment, the IM translates the data from the legacy system to control one parameter of the host device. For example, a legacy dimmer controls the light intensity, but other parameters of the emitted light are determined independently, based on other data. For instance, the SPD of the light is determined by time of day, or may be influenced by other sensors (either legacy sensors or other sensors). In another embodiment, the IM translates the data from a legacy system to controls associated with parameters of the emitted light. For instance, a legacy dimmer may control the light intensity and CCT/SPD at the same time, with intensity and SPD being directly tied to each other. The relationship between various parameters (such as intensity and SPD) may be predetermined (for instance it may be a curve which emulates the "warm-dimming" of a filament lamp) or may be defined as a user preference (for instance a user may decide that he wants to maximize blue content in the SPD at high intensity and minimize it at low intensity). Such relationships between different output parameters may reside in a memory or in a firmware. They may take the form of a numerical look-up table, or a formula for tying output parameters together and to the legacy input. In other embodiments, the data form the legacy system is multi-dimensional. For instance, two separate dimmers may send data to the lighting system. The two data streams may independently modulate different parameters of the emitted light: for instance, intensity and SPD.

Although the discussion above considers integrating an IM lighting system with a legacy control system, it should be understood that other IM system may be integrated with legacy control systems. For instance, an IM system may be a heater having an output temperature controlled by a legacy control box.

Networks

The IM lends itself to different network configurations using the electrical powerline of a home or building as a backbone. For example, referring back to FIG. 3, the network 300 comprises first nodes 331 electrically connected to an electrical powerline 320 with second nodes 332 such that first and second nodes 331, 332 are configured to transmit information therebetween over the powerline 320. (It should be understood that powerline 320 is depicted outside of the walls of the apartment for simplicity and illustrative purposes, although ordinarily the powerline would be inside the walls and not visible.) As mentioned above, the host devices 350 of the first and second nodes may be the same or they may be different. In one embodiment, the nodes connected to the powerline have PLC communication functionality.

The networks envisioned in this application include local area networks (LAN). In some cases, the network extends over a room, a home, a commercial/office floor, a commercial/office building, a warehouse. In some cases, all host devices and intelligent modules belong to the same network. In some cases, the network is segmented in sub-networks which can communicate. For instance, in a large building having several floors, each floor (or other section of the building) may have a network (with a separate list of addresses, etc) and gateways enable communication between the sub-network. In some applications, the LAN is further connected to a larger network, for instance a WAN, the internet or some cloud service. In some cases, the physical extent of the LAN is less than 1000 m, less than 300 m, less than 100 m, less than 30 m.

The network of the present invention can be configured differently with different host devices at different nodes. For example, referring back to FIG. 3, host devices include lamps 351, stereo 352, stove 353, outlet 354, dimmer 355, adapter 356, and Internet gateway 357, all connected to the power line 320. Each of these is a different node on the network. A number of these are first nodes, meaning they have an IM installed, while the others are second nodes meaning that do not have an IM installed. Specifically, IMs 301 are plugged in a few lamps 351a, 351b, 351c, the outlet 354, and the plugin adapter 356. The remaining host devices 350 are part of second nodes 332 in that they are communicatively linked with the first nodes 331 but do not necessarily have IMs installed. In one embodiment, the connectivity between all the nodes is over the powerline 320 using PLC communication.

In one embodiment, the nodes on the network are assigned to groups, in which each group has at least one first node to control the group. The groups can be assigned based on various criteria, including, for example, the function of the host device (e.g., lighting, sound, temperature, etc.), their location within the in building (e.g., living room, kitchen, bed room, etc.), and/or their usage pattern (e.g. routine use, event-driven use), or any combination of criteria. For example, lamps 351 may be assigned to a group 370 because they are clustered together in the living room (location based); lamps 351 in the bedroom 341 and adjoining bathroom 343 may be assigned to a group 372 because lamps used in the bedroom and adjoining bathroom are typically used together in the evening and morning (routine use based); and lamps 351 in the nursery 341, hall 346, and kitchen 345 may be assigned to a group 371, because lights in these spaces are typically used together in the middle of the night if the baby wakes up (event-driven use based).

Additionally, it should be understood that a node may belong to more than one group. For example, lamps in foyer 347, bedroom 341 and living room 340 may be assigned group 373 because a user may want those rooms illuminated if someone rings the doorbell (event-driven use). In this example, group 373 contains a portion of lamps from group 370 and 372.

Furthermore, in some embodiments, the network 300 may comprise an Internet gateway 357 for 24/7 connectivity with the cloud 384, via Wi-Fi 385 and modem 386. In this particular network, the IM 301a is configured to interact with a wireless signal 391 from a smart phone 380 or other wireless remote control device. Likewise, IM 301b is configured with wireless to communicate with the remote control 381 for stereo 332. In one embodiment, the user sets up an Internet/Cloud-based account at the point of sale of an IM system. The IM system includes the gateway 357, which is plugged into the powerline of the user's location. In one embodiment, the gateway 357 communicates with the Internet/Cloud via a wireless router to further establish the Cloud account. (Alternatively, the gateway may communicate over PLC to an internet interface.) The gateway 237 also addresses the other devices on the powerline (e.g., lamps). In this way, the gateway connects the network of the IM to the internet/Cloud. In one embodiment, it establishes time for the IM network, and may control the network based on time and temperature. In one embodiment, the gateway is domain controlling.

In an embodiment, the gateway acts as follows. The gateway comprises a Wifi chipset and a powerline chipset. The gateway is configured to communicate over Wifi with the user's Wifi router, thus enabling access to the internet, and in particular to cloud servers. This includes the "primary" cloud server which directly administers the IM service. Third-party cloud services can also be reached, either through direct connection from the gateway, or through the primary cloud server (the latter case may be beneficial since security between the primary server and the gateway can be ensured). The gateway can communicate with the IM network through powerline communication. The gateway provides fault-tolerance: it can store various settings and rules for the TMs (for instance, the timing at which a spectrum of light should be changed). If an IM loses power and its memory is cleared, it can recover its rules, as well as date/time information, by interrogating the gateway. Further, the gateway can store such rules in the primary cloud, so that the rules can be recovered if the gateway itself loses its memory. The gateway may have a static memory and/or a volatile memory. By giving access to third-party clouds, the gateway enables a number of IoT functionalities (for instance, voice commands received by a third-party IoT device can be sent to the third-party cloud, then to the primary cloud where they are converted to an instruction, then to the gateway, then to the IM network). The gateway also enables control of/communication with the IM network "from the outside". For instance, a user outside the house can use their phone to connect to a cloud, which connects to the gateway, which connects to the IM network. This enables the user to send commands to the IM network, and to receive information/alerts from the IM network.

In an embodiment, factory settings can be restored to a device and/or IM. This may be useful if the memory of the device/IM has been corrupted. Restore can be triggered by a predetermined action on the device, such as flipping the electrical switch controlling the device on and off several times (such as 2, 3, 4, 5 etc) in a rapid fashion (such as faster than once per second or five seconds): the device detects this unusual on/off cycle, and interprets it as a reset command. This can be advantageous over a standard hardware-based reset button, which would require access to the device.

Applications

The network 300 facilitates a variety of different applications.

Smart Lighting

In one embodiment, one or more IMs are used in combination with the host lamp devices to provide a smart lighting system. Such a smart lighting system can be configured in different ways to alter either light intensity or light spectrum, or both, or to optimize parameters such as efficiency, uniform light intensity, Circadian cycles, or bacteria suppression, just to name a few.

a. Efficiency

In one embodiment, the smart lighting system is configured to maximum efficiency. For example, in one embodiment, the system comprises a network group 370 of lamps— i.e., host lamp 351a has an IM 301a installed, and the other host lamps 350 have PLC modules but do not necessarily have an IM. The IM 301a in this system is configured with a number of sensors that are used to gather data to facilitate the efficient operation of the lamps. In this particular embodiment, the sensors include a PIR, microphone and ALS. This selection of sensors has been shown to provide important data to determine the occupancy of a given space/room and the ambient light, two important parameters in determining whether the group of lamps 370 should be on/off and at what intensity they should operate. Specifically, the PIR and microphone operate in combination to determine if occupancy—i.e., the PIR detects infrared and the microphone detects sounds. The two sensors together provide a more reliable indication of occupancy than either device alone. Occupancy data can then be used to determine when the lights should be turned on and off. Additionally, occupancy data can be used to learn patterns and habits of the occupants to better operate the host devices as discussed below. The ALS detects the ambient level of light in the room to control the overall light intensity of the lamps 351 in the room throughout different times of the day. Still other configurations of sensors may be used to optimize efficiency, and such configurations will be understood by those of skill in the art in light of this application.

b. Circadian Cycle Accommodation

In another configuration, the IM and its associated devices are configured to accommodate a person's circadian cycle. The intensity and quality of light have been shown to have a significant effect on a person's circadian cycle. See e.g. U.S. Patent Application Publication Nos. 2016/0341436 A1 and 2016/0339203 A1, herein incorporated by reference. For example, it is generally known that white light having relatively high component of blue light tends to stimulate a human circadian cycle, increasing metabolism, while white light having a relatively low blue light component tends to lower metabolism, thereby inducing rest/sleep. Therefore, depending on the time of day, the lights may be adjusted to increase or decrease the blue light component in the light.

For example, people tend to occupy bedrooms and adjacent bathrooms at night when melatonin levels should be maintained at a high level, and in the morning when melatonin levels should be low. Accordingly, in one embodiment, the lights 351 in bedroom 341, bathroom 343 are in network group 372 along with adapter 356, which contains IM 301b. (Although this example groups only the lamps in the bedroom and bathroom together, it should be understood that all the lamps may be grouped together to accommodate a person's circadian cycle.) IM 301b is configured to adjust the properties of light (i.e. light level, spectrum) to minimize the blue light dose in the white light during the late evening hours. Specifically, an IM may be configured with a light sensor to sense the CCT of the light, and adjust the CCT of the lamps to track with the sun throughout the day. For example, in the day, the CCT of the lamps may be 3,000K to 6,500K, full spectrum, and at sunset, the lamps are instructed to drop out the blue as CCT lowers to 1800K to 2700K. Meanwhile, the lumen output remains relatively constant during the daytime e.g., 850 lumens and is reduced at night, e.g. 600 lumens. Thus, in this embodiment, during the early morning and daytime hours when melatonin levels are low, the light emitted by the lamps is rich in blue light, which is known to stimulate humans. Beyond simple CCT tuning, more advanced spectral tuning may be used to reduce the amount of blue light (or circadian-stimulating light) for a given CCT, for instance by using violet light.

The network communication capabilities of the invention may be used to tune the spectrum of several light emitters in concert. For instance, the spectra emitted by a display and a lightbulb may be tuned to reduce blue content at the same time. Such tuning instructions may be send by combining PLC and wireless signals.

c. Bacteria Suppression

In another configuration, the IM and its associated devices are configured to suppress bacteria in rooms and buildings where such bacteria can be particularly problematic, e.g. kitchens, nurseries and hospitals. For example, in one embodiment, the kitchen 345 and the nursery 344 are configured with lamps 351 which are configured with controlled LED arrays with a boost function to emit and direct a 405 nanometer (visible violet) for bacterial suppression effects. Researchers found that violet light at 405 nanometers affects bacteria DNA. Such wavelengths are weaker than UV-C, but avoids the UV-C harmful effects, and equates to safe light to suppress bacteria with light. Accordingly, lamps can be moderated to increase the violet light component of white light to reduce bacterial formation. Specifically, dynamic software controlled LED array includes boost function to emit and direct a 405 nanometer (visible violet) for 100% more bacterial suppression effects. Such violet-emitting lights are known in the art. For example, technologies uniquely in a position to generate violet light with the highest efficiency, in particular, the Soraa lights usually four or five violet-emitting diode as the pump light for the white LED lamp. Alternatively, rather than increasing the violet light component in the spectrum, the IM and its associated devices may be configured to blast violet light when it determines that no one is in the room.

Enhanced Wireless Communication

The network of the present invention can also be used to enhance wireless communication by using the powerline backbone to extend the range or avoid obstacles in a wireless network. For example, referring back to FIG. 3, in one embodiment, the network 300 comprises a first node 331b having a wireless enabled IM 301 in room 341 and a second node 332 comprising a host stereo device 352 in a different room 340. The second node (i.e., the host stereo device 352) and the first node (i.e., IM 301) are communicatively linked over the electrical powerline 320 as shown in FIG. 3. A wireless remote control device 381 in room 341 is used to control the stereo device 352. (Note, this wireless device may be any wireless device as described above.) Ordinarily, a wireless device 381 in room 341 would not be capable of controlling the stereo device 353 in room 340 because of walls 342 and other structures between the two devices. However, the network 300 facilities communication of the wireless device 381 and the stereo device 353 by communicating over the powerline 320 that connects the first and second nodes 331, 332. That is, while the wall 342 might have otherwise blocked the wireless signal between devices 381 and 353, the IM 301b of the first node 331 is configured to receive the wireless signal from the device 381, and then cooperate with the host device (in this case IM adapter 356) to transmit a signal based on the wireless signal along the powerline 320 to the second node 332 to which the host stereo device 352 is attached. In this embodiment, the host stereo device comprises a PLC module to receive the signal from the IM 301b and to instruct the stereo to respond accordingly—e.g. volume up or down or power on or off.

In some embodiments, the network is a standalone network having limited connection to the Internet, thereby making the network immune to the connectivity of the home/building with the Internet. For example, in one embodiment only one "gate" device in the network has access to the outside world (for instance, to the internet cloud). Other devices are PAN devices with only local network access (for instance, Bluetooth). These devices gain access to the outside world by communicating through the network to the gate. For instance, the smartphone 380 with Bluetooth connection connects to a nearby lamp 351a having an IM 301a. The lamp 351a connects through PLC to an Internet modem 386, so that the smartphone has Internet access, even though it may not be in direct Bluetooth range of the wireless router 385 because of walls or other structures as shown in FIG. 3.

In another example, the network comprises a gateway hub 357, which is voice-activated and wirelessly linked to the Internet using a known wireless link such as Wi-Fi 385 and Internet modem 386. Such gateways are known and are commercially available (e.g., Amazon Echo). In one embodiment, the gateway 357 "listens" to audible instructions from users which it then sends to the cloud (e.g. Amazon Cloud), where the instructions are recognized as pertaining to a specific device on a first or second node (e.g., a host lamp device, as described above, as supplied by a certain Manufacturer). The instructions are then sent from the cloud to the Manufacturer's cloud, processed by that cloud and sent back to the specific device (i.e. host lamp device) in the home, for the function to be performed. The advantage of such network architecture is that the host device can be compatible with generic gateway hubs, without requiring specific instruction programming into the hub's software.

Although the wireless communication is depicted in FIG. 3 as being effected by a PLC communication between a first node 331 and second node 332, the communication can also be between effected between two first nodes (i.e., the node with the host stereo device 356 may also have an IM), or between two second nodes (i.e., the host devices on the second nodes have PLC modules and the device receiving the wireless communication has a wireless communication module.).

In an alternative embedment, the wireless communication is between a wireless enabled second node and a wireless enabled device that is not on the network because it is does not have PLC or is otherwise not connected to the powerline. An example of a wireless enabled device that is not on the network is a standalone, battery-operated smoke detector. When the device transmits a wireless signal (e.g., smoke detected) the second node with wireless capability receives the signal and transmits it along the powerline using PLC to the proper network node, e.g., a node having an alarm (audible and/or visual) for indicating the detection of smoke. Thus, the network extends the effective range of non-networked/battery-operated wireless device.

Still other configurations for enhancing wireless coverage will be obvious in light of this disclosure.

Locating System

In one embodiment, the intelligent network is configured as a locating system to locate and/or monitor the location of objects. The objects may be any item having a unique identifier—e.g., a unique physical, audible, thermal, or electrometric signature—which is detected by a corresponding sensor in an IM of the present invention. Because of the potential for numerous IMs to be used in outlets throughout a home or building, the present invention provides a unique platform to locate objects with a high degree of precision within the home or building. Thus, the locating system is adapted to find objects that are often lost, misplaced or forgotten in a home, such as, for example, keys, phone, remote control, smartphone, wallet, or purse. Further, the system can be used to monitor children/pets who wonder in the home/building by tracking either their bodies or the cloths/collar they wear. In yet another embodiment, the system can be used to monitor products or inventory in a store or factory to monitor inventory levels or guard against theft. Still other applications of the locating system will be obvious to those of skill in the art in light of this disclosure.

In one embodiment, at least one IM is configured to scan a certain area and to signal whether the object is in the area. There are different ways in which the IM can scan the area, including, for example, image recognition, sound profile, thermal profile, and even electromagnetic signature as transmitted or reflected by an RFID tag. The system is configured to correlate the object with a searchable unique identifier (e.g., image recognition transform (e.g., Fourier domain image), sound profile, thermal profile, RFID tag, etc.). The IM then scans the area for the unique identified and signals the user whether the object is or is not detected in the area. The system can be configured to execute a search in different ways. For example, the user can directly instruct the system to search for a particular object (e.g., search for keys), or rules can be established which automatically trigger a search (e.g., if the user is leaving the house, make sure user has wallet, otherwise signal user.)

For example, referring to FIG. 3, one embodiment of the locator system is shown. Here, at least one IM 301a is configured with an RFID reader for scanning an area 348a within living room 340 for RFID tags. Such RFID tags are well known and include passive and active RFID tags. When the user wants to search for an object, it selects the object from a menu, perhaps using the smartphone 380 or other user interface. The object is then correlated with a unique RFID tag. The IM 301a causes a signal to be transmitted if the RFID reader detects the object's tag within the area 348a.

The type of signal may vary. In one embodiment, the signal is a visual or audible signal (e.g., flashing light or beep) transmitted by the IM 301a or the host device 350 to which the IM is connected. For example, if the host device is a lamp 351, the lamp may modulate the light being emitted to indicate to the user that the object being sought is within the area of the lamp. In another embodiment, the signal is transmitted wirelessly form the network 300 to a wireless device 380 to notify the user. For example, the system may send an email to the user's smartphone or computer indicating that his wallet is in area 348a.

In the example above, the locating system has been considered with respect to a single IM. It should be appreciated, however, that the flexibility, reliability and precision of the system increases significantly when a plurality of IMs are used, especially if the IMs are networked. In one embodiment, a plurality of first nodes has IMs configured with RFID readers to provide an indication of the object's location relative to the plurality of IMs. In a preferred embodiment, at least three IMs 301a, 301c, and 301d covering areas 348a, 348b, and 348c are used to triangulate the location of the object's RFID tag. Triangulation is a well know concept and can provide a precise location of an object in and around the three IMs.

Networking the IMs as shown in FIG. 3 provides for additional benefits. First, triangulation of the IM is readily facilitated as the network 300 enables essentially all the first nodes to be used in the locating system. As mentioned above, given the high number of outlets a typical home or building has, the locating system of the present invention can populated with many sensors to provide a high resolution indication of the location of objects within the home or building. Additionally, the network facilities additional ways in which to signal the location of the sought object. For example, if the IMs are associated with lamps, the lamps can flash in a certain sequence to lead the user to the sought object. In still another embodiment, the location information is transmitted to another node, for example, a computer, smartphone, or the cloud.

Additionally, machine learning (discussed below) may be integrated with the locating system to learn the user's habits and potentially signal the user when he is about to leave something behind which he usually brings with him. For example, referring to FIG. 3, if the user is walking out of the foyer 347 without his wallet, the system alerts him of this fact. In this embodiment, the system is programmed to automatically conduct a search if a particular user has his wallet as he walks through the foyer 347 toward the front door, and signals the user if no wallet is detected. The system may alert the user in different ways. For example, in one embodiment, the system may cause the foyer light to flash on and off, or the system may send an alert to the user's smartphone or automobile.

Beyond the personal area network 300 disclosed in FIG. 3, the network can be expanded to include multi-location networking to communicate across a large area network. For example, at a user's work network, the user may receive alarms such as "you left your wallet at home" or "you left your keys at the office." Likewise, the network may extend to hotel rooms to inform the user if he or she left something behind after checking out.

In a general class of embodiments, the smart network utilizes machine learning to learn about the behavior of the users and then adapts the operation of the intelligent network based on this learning. In other words, the ability of the network 300 to have many IMs at the various outlet throughout the house and thereby monitor and record a user's behavior—e.g. user's location/occupation (e.g. IPS as discussed above), usage of certain lamps at certain intensities, usage of appliances, volume of stereo, temperature settings, etc.—as a function of environmental conditions—e.g. time, day, season, ambient light, temperature, humidly, etc.—and/or events—e.g., doorbell rings, baby cries, dog barks, watching TV, listen to music, sleeping, cooking, washing a baby in a tub, etc.—enables the network to learn vary accurate and insightful behavior of the user to allow the network to control the host devices on the network—e.g., lighting, heating, appliance control, etc.—to conform with the user's behavior. Devices with imaging capabilities may be used to recognize/identify users through visual information, including facial recognition. Data inputs, in addition to data acquired from sensors or sent over the network, include the following: date, time of the day, weather/environment data, amount of outdoor light, location of a user in a room, location versus time, user movement user's general level of activity, specific words or gestures, user actions on a device, user's past behavior (such as wake-up time or past sleep pattern).

The network can be configured in different ways for machine learning. In one embodiment, using various sensors on various nodes, the network learns a specific behavior of a user related to certain events and/or environmental conditions using deep learning (also known as deep structured learning, hierarchical learning or deep machine learning). This is a branch of machine learning based on a set of algorithms that attempt to model high-level abstractions in data. In a simple case, you could have two sets of neurons: ones that receive an input signal and ones that send an output signal. When the input layer receives an input it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations. In another embodiment, the network is configured as a neural network (also referred to as connectionist systems), which employs a computational approach based on a large collection of neural units loosely modeling the way a biological brain solves problems with large clusters of biological neurons connected by axons. Each neural unit is connected with many others, and links can be enforcing or inhibitory in their effect on the activation state of connected neural units. Each individual neural unit may have a summation function that combines the values of all its inputs together. In another embodiment, Bayesian inference is used, which is a method of statistical inference in which Bayes' theorem is used to update the probability for a hypothesis as more evidence or information becomes available. Bayesian updating is particularly important in the dynamic analysis of a sequence of data.

In an embodiment, the data for the machine learning is gathered by the IM network. This data is then sent to the cloud, where large computational power enables the derivation of complex rules though machine learning. Finally, the rules are sent back to the IM network where they reside locally and can be executed. This implementation differs from standard cloud-based IoT services, in which rules are oftentimes stored in a cloud (a legacy approach which has drawbacks, such as higher latency and unavailability of the rules if the internet connection is disrupted). In contrast, an implementation with locally-stored rules can provide for faster execution and higher robustness. The rules can be stored in the memory of an IM and/or in a gateway device, as described above. The rules can be stored redundantly in the IM network to be resilient. The rules can be refined over time with more machine learning based on additional data, and updated rules can be downloaded locally to the IM network. The user may also provide feedback on the rules, which can be used as an input for future machine learning.

In one particular embodiment, the network 300 facilities an indoor positioning system (IPS). The IPS integrates occupancy data with other data such as time and event data to monitor and predict the location of individuals within a home or building. Generally, the movement of people in a home or building tends to be related to time and/or events. The network can learn the different patterns of people occupying a home or building—e.g., when they tend to come home and what rooms they tend to occupy during different times of the day. Because the network of the present invention uses the outlets of the powerline which tend to be very numerous, the network has the ability to collect particular, high resolution data of occupants from many different locations within the home or building. By understanding and learning the typical movements of people within a home or building, smart systems can adapt to provide, for example, a desired light and temperature as people move throughout the home.

The network 300 can be used as an IPS by using occupancy data with other data such as time of day and/or event data (e.g., sounds in the nursery, door bell, etc.) to determine not only the position of a person in the home or building, but also their predictive movements. In one simple example, the IPS learns that at certain times of the night, a person gets up in bedroom 341 to use bathroom 343. Accordingly, a rule can be established that if a person gets up in bedroom 341 between 10 pm and 5 am, lamp group 372 should be illuminated with a low intensity and low blue light component so as not to wake the person up (as discussed above).

In a more complex example, the IPS learns that if there is a noise in the nursery 344 between 1 and 3 am, a person in bedroom 341 gets up, travels down hallway 346, through living room 340 and into the kitchen 345, uses the microwave oven 353 for 1 minute to heat a bottle, and then travels back through living room and hallway into the nursery 344. Based on this learning, the network (or a computer which is connected to the network) develops a rule—e.g., if there is a sound in the nursery between 1 and 3 am, heat the microwave for 1 minute if it contains a bottle, and turn on lamp groups 371 using a low blue light. Further to this example, assume that often the person in the bedroom has difficulty waking up to take care of the baby, and thus the system learns that the baby often makes noise for an extended period (e.g. >5 min) before the person gets out of bed. In this situation, the rule above can be modified to flash lamp group 372 using high blue light (i.e., to wake person up) if there is noise in the nursery between 1 and 3 that continues for more than 5 minutes and the person has not left the bed in bedroom 341. Essentially any rule can be developed based on a user's behavior.

Network Setup

In one embodiment, the IM and host devices are configured to self-identify for purposes of establishing a network. Various approaches for aching self-identification are possible within the scope of the invention. The following examples consider self-identification of lamps, although the host device may be any host device as described above. In the following examples, lamps (or other host devices) have a serial number (i.e. a unique number marking their hardware) and a network ID for communicating on the network. The ID is specific to a location (i.e. a lamp socket) so that when a lamp replaces another, it should obtain its ID.

For example, in a first new-installation, four new lamps (only one which has an IM) are installed in a brand new network and are being turned on simultaneously for the first time. The IM transmits a signal over the powerline using PLC to discover other IMs or host devices configured with PLC as described above. In this example, the IM discovers the other three lamps, but they do not have IDs yet. In the absence of an ID response, the IM determines IDs for the three lamps (or for as many lamps are in its network/group) and assigns them to the various lamps. If one of the lamps is subsequently replaced. The lamp with IM detects a lamp replacement, and assigns the ID of the missing lamp to the new lamp.

In another example, two groups of smart lamps exist on the same network in which each group has at least one lamp with an IM to manage the group. The two IMs of the two groups will exchange all group information (including specific lamp ID and network ID). Further, the nature of each IM is communicated so that the whole network knows that a new IM enabling a new functionality is present.

In yet other examples, the network contains not only lamps, but also other devices like appliances. For example, one group has thermostat and another group has a lamp with a thermometer IM. Upon setup, the thermostat learns that a lamp with a thermometer IM is now present. The thermostat then subscribes to "temperature events" so receive data from that IM. The two communicate (i.e., the IM thermometer sends data when temperature changes, the thermostat receives it because it subscribed).

In another example, an Internet gateway connects to the cloud (for instance by connecting to the home's Wi-Fi internet router). The gateway is configured with information regarding different cloud services and different IM functionalities. IMs can register themselves to cloud services through the gateway. For instance a power utility sensor registers itself with the utility, or a seismic sensor registers itself with USGS. The presence of the gateway is useful because it can screen the IMs from direct access to the cloud/internet. This enables advantageous information security features. For instance, the gateway encrypts all data it receives from the home network before such data is sent to the cloud. Decrypted data is only exchanged internally on the home network, between secure devices—therefore the user's information/data is not openly shared.

Product Packaging

Because lights are typically operated in groups, it is preferable in some embodiments to package the lamps together for a given room. In other words, it may make sense to bundle lamps according to the room. For example, lamps used in a living room may have one or more IMs configured to determine occupancy and also to adjust for ambient light since these rooms are often used during the daytime. In another embodiment, a set of lamps may be bundled for use in a bedroom in which they are configured with one or more IMs that are configured to adjust the quality of light in the bedroom such that the quality of light tracks with the circadian rhythms of the occupants. Another room package may be for a nursery, which may comprise, for example, an IM having a sound sensor for determining when the child is up or moving, or imaging functionality for imaging the child. A kitchen package may be characterized by an IM having bacterial suppression control for periodically increasing the ultraviolet light to suppress bacteria.

What is claimed is:

1. A method of transmitting information securely about events in a building to a network, the method comprising:
   obtaining data about one or more events from at least one sensor in real time, said sensor being disposed in a fixed position in or about said building;
   transmitting said data from a first device connected to said sensor to a second device over a powerline utilizing powerline communication, wherein said second device is operatively connected to a network gateway;
   transmitting said data from said network gateway to said network; and
   encrypting said data to provide end-to-end data encryption between at least said first device and said network.

2. A system for transmitting information securely about one or more events in a building to a network, the system comprising:
   at least one sensor for detecting one or more events, said sensor being stationary and communicating in real time;
   a first device connected to said sensor and to a powerline, said first device comprising at least a powerline communication module and an encryption chip, said first device being configured to transmit encrypted data over said powerline utilizing powerline communication;
   a second device connected to a network gateway and to said powerline, said second device comprising at least a powerline communication module and an encryption chip, said second device being configured to receive said encrypted data over said powerline utilizing powerline communication; and
   said network gateway connected to said second device and configured to transmit said encrypted data to said network.

\* \* \* \* \*